(12) United States Patent
McConnell et al.

(10) Patent No.: US 7,406,330 B2
(45) Date of Patent: Jul. 29, 2008

(54) METHOD AND SYSTEM FOR EXTENDING IP PBX SERVICES TO CELLULAR WIRELESS COMMUNICATION DEVICES

(75) Inventors: Von K. McConnell, Leawood, KS (US); Jeffrey F. Phillips, Lees Summit, MO (US); Dorene Weiland, Lake Lotawana, MO (US); Charles E. Woodson, Peculiar, MO (US); Farni Weaver, Spring Hill, KS (US); Lyle W. Paczkowski, Mission Hills, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 798 days.

(21) Appl. No.: 10/902,323

(22) Filed: Jul. 29, 2004

(65) Prior Publication Data
US 2006/0030357 A1 Feb. 9, 2006

(51) Int. Cl.
*H04M 1/00* (2006.01)
(52) U.S. Cl. ............... 455/554.1; 455/554.2; 455/414.1; 455/555; 379/88.22; 379/88.23; 379/88.25; 379/88.27; 370/328; 370/329; 370/340; 370/465; 370/493
(58) Field of Classification Search ............... 455/554.1, 455/550.1, 555, 552.1, 432.1, 554.2, 414.1; 379/88.22, 88.23, 88.25, 88.27; 370/329, 370/335, 340, 465, 493
See application file for complete search history.

(56) References Cited

U.S. PATENT DOCUMENTS

| | | | |
|---|---|---|---|
| 6,073,029 A | 6/2000 | Smith et al. | |
| 6,285,879 B1 | 9/2001 | Lechner et al. | |
| 2001/0046215 A1* | 11/2001 | Kim | ........................... 370/329 |
| 2002/0080757 A1 | 6/2002 | Narvanen et al. | |
| 2002/0120748 A1 | 8/2002 | Schiavone et al. | |
| 2002/0122544 A1 | 9/2002 | Williams et al. | |
| 2003/0013489 A1 | 1/2003 | Mar et al. | |
| 2004/0037402 A1 | 2/2004 | Adamczyk et al. | |
| 2004/0072593 A1 | 4/2004 | Robbins et al. | |
| 2005/0063359 A1* | 3/2005 | Jagadeesan et al. | ......... 370/352 |
| 2005/0129069 A1* | 6/2005 | Binder | ...................... 370/493 |

(Continued)

FOREIGN PATENT DOCUMENTS

WO    WO 00/78017 A1    12/2000

OTHER PUBLICATIONS

New Step Networks, "Calling Service Node," 2004.

(Continued)

*Primary Examiner*—Duc M. Nguyen
*Assistant Examiner*—Khai Nguyen

(57) ABSTRACT

An IP PBX system that serves enterprise telephones via a landline IP network connection is be expanded to serve cellular wireless communication devices (WCD) via a cellular wireless carrier's radio access network (RAN). Calls to and from the cellular WCD are connected through the cellular carrier's RAN and the IP PBX system, so that the IP PBX system can control and manage the calls just as the IP PBX would control and manage calls involving other extensions on the IP PBX. A cellular WCD thereby becomes an IP PBX client station, i.e., an extension on the IP PBX system. As such, the cellular WCD can seamlessly benefit from many of the same IP PBX features that other more conventional IP PBX client stations (e.g., desk phones) enjoy.

29 Claims, 11 Drawing Sheets

U.S. PATENT DOCUMENTS

| | | | | |
|---|---|---|---|---|
| 2005/0190747 | A1* | 9/2005 | Sindhwani et al. | 370/352 |
| 2006/0023658 | A1* | 2/2006 | Phillips et al. | 370/328 |
| 2006/0025114 | A1* | 2/2006 | Bales et al. | 455/413 |
| 2006/0025139 | A1* | 2/2006 | Bales et al. | 455/445 |
| 2006/0025140 | A1* | 2/2006 | Bales et al. | 455/445 |
| 2006/0251113 | A1* | 11/2006 | Jagadeesan et al. | 370/465 |

OTHER PUBLICATIONS

New Step Networks, "Incumbent Service Providers," http://www.newstepnetworks.com/customer_centric1.html, printed from the Internet on Mar. 17, 2004.

New Step Networks, Data Sheet, "Calling Service Node", 2003.

New Step Networks, "Feature Control Points (FCP) Overview," printed from the Internet on Mar. 17, 2004.

Lucent Technologies, IP Multimedia Subsystem (IMS) Service Architecture, 2004.

Bales et al., U.S. Appl. No. 11/135,116, filed May 24, 2005, "Method and System for Selective Application of Cellular-PBX Integration Service".

Bales et al., U.S. Appl. No. 11/135,946, filed May 24, 2005, "Method and System for Account Balance Restriction on Application of Cellular-PBX Integration Service".

Phillips et al., U.S. Appl. No. 11/135,973, filed May 24, 2005, "Method and System for Location-Based Restriction on Application of Cellular-PBX Integration Service".

Bales et al., U.S. Appl. No. 11/135,899, filed May 24, 2005, "Method and System for Dynamic Selection of Voice Mail System".

Woodson et al., U.S. Appl. No. 11/135,875, filed May 24, 2005, "Method and System for Selective Application of Cellular-PBX Integration Service."

International Search Report and Written Opinion of the International Searching Authority from Application No. PCT/US2005/026583, dated Feb. 10, 2006.

* cited by examiner

METHOD AND SYSTEM FOR EXTENDING IP PBX SERVICES TO CELLULAR WIRELESS COMMUNICATION DEVICES

FIELD OF THE INVENTION

The present invention relates to telecommunications and, more particularly, to cellular wireless communications and private branch exchange communications.

BACKGROUND

Private branch exchange (PBX) systems are well known in the art. In a typical arrangement, an enterprise will operate a PBX server that interfaces between each of the telephone stations in the enterprise and a local telephone company central office of the public switched telephone network (PSTN). Conventionally, each telephone station will have an assigned PBX extension number, and some of the stations may also have direct inbound dial (DID) numbers for receiving calls directly from the PSTN. The PBX server may then provide its stations with many useful features, such as the ability to dial by extension, the ability to transfer calls, the ability to establish conference calls, and the ability to interact with an enterprise voice mail service.

Traditional PBX servers connect with each of their served telephone stations by a respective physical telephone line, which can be inefficient and difficult to manage. Recent improvements in Voice-over-IP communications have made possible an improved form of PBX server, known generally as an IP PBX server. Typically, an IP PBX server sits as a node on an enterprise's computer network (e.g., LAN), and each of the enterprise telephone stations in turn sits as a respective node on the computer network as well. Signaling and bearer communications between the telephone stations and the IP PBX server then traverse the computer network as IP communications. Like a conventional PBX server, the IP PBX server may be coupled to a telephone company central office, so that the enterprise telephone stations can place and receive calls via the PSTN.

An enterprise IP PBX system provides great convenience for users of desktop telephone stations at the enterprise. Increasingly, however, people are often working from home or otherwise on the road, rather than at the office. As such, people frequently use cellular wireless communication devices (WCDs), such as cell phones, rather than their desktop enterprise telephone stations. WCDs place and receive calls through cellular radio access networks, rather than through an IP PBX system. Thus, when on the road, an enterprise worker would not benefit from the features of the enterprise IP PBX system (other than by dialing into the IP PBX system through a DID telephone number.)

SUMMARY

According to the present invention, an IP PBX system that serves enterprise telephones via a landline IP network connection will be expanded to serve cellular wireless communication devices (WCD) via a cellular wireless carrier's radio access network (RAN). To do so, a signaling and bearer path infrastructure will be placed between the cellular carrier's RAN and the IP PBX system. Calls to and from the cellular WCD will then be connected through the IP PBX system, so that the IP PBX system can control and manage the calls just as the IP PBX would control and manage calls involving other extensions on the IP PBX.

The invention will thus allow a cellular WCD to become an IP PBX client station, i.e., an extension on an off-the-shelf IP PBX server. As such, in an ideal arrangement, the cellular WCD will seamlessly benefit from many of the same IP PBX features that other more conventional IP PBX client stations would enjoy. Further, the cellular WCD could seamlessly benefit from these features anywhere within coverage of the cellular carrier's network.

For instance, in a preferred arrangement, the cellular WCD would have an assigned PBX extension number and would thus be able to receive inside-calls placed to that extension number from other stations in the IP PBX system. As another example, the cellular WCD would be able to place inside-calls to other stations in the IP PBX system by dialing their extension numbers. At the same time, the cellular WCD would ideally maintain a public directory number and could thus receive outside calls placed to that directory number and place outside calls from that directory number.

As still another example, the cellular WCD would ideally be able to transfer an existing call to another extension in the IP PBX system and set up conference calls with other extensions in the IP PBX system. And as another example, the cellular WCD would ideally benefit from a voice mail system associated with the IP PBX system, so that unanswered calls to the cellular WCD could be forwarded to the voice mail system, and a user of the cellular WCD could readily access the voice mail system to listen to messages. And as still a further example, the cellular WCD would ideally be able to dial IP PBX feature codes to access various features of the IP PBX system. Still other examples, and variations on these examples, are possible as well.

Thus, in one respect, an exemplary embodiment of the invention can take the form of a method that includes the functions of (i) receiving into a cellular RAN a call request seeking to set up a call for a cellular WCD that is operating in a wireless coverage area of the RAN; (ii) responsively (a) engaging in first call setup signaling between the cellular RAN and a media gateway system to set up a first leg of the call between the cellular RAN and the media gateway system, (b) identifying an IP PBX system that serves the cellular WCD, and (c) engaging in second call setup signaling between the media gateway system and the IP PBX system to set up a second leg of the call between the media gateway system and the IP PBX system; and (iii) setting up the call from the IP PBX system for the cellular WCD.

In another respect, the exemplary embodiment can take the form of a method that includes the functions of (i) maintaining in an IP PBX system a set of data that correlates a first extension on the IP PBX system with a directory number of a cellular wireless communication device (WCD) and further with a second extension on the IP PBX system; and (ii) receiving into the IP PBX system a call setup message seeking to set up a call to the first extension, and responsively (a) engaging in first call setup signaling to set up the call from the IP PBX system to the directory number of the cellular WCD and (b) engaging in second call setup signaling to set up the call from the IP PBX system to the second extension on the IP PBX system.

In yet another respect, the exemplary embodiment can take the form of a system that includes a cellular RAN, a media gateway system, and an IP PBX system. When the cellular RAN receives a request seeking to set up a call for a cellular wireless communication device (WCD) that is operating in the wireless coverage area, the cellular RAN engages in first call setup signaling with the media gateway controller to set up a first leg of the call between the cellular RAN and the media gateway. Further, the media gateway controller determines that the IP PBX system serves the cellular WCD, and the media gateway controller responsively engages in second call setup signaling with the IP PBX system to set up a second leg of the call between the media gateway and the IP PBX system. And further, the IP PBX system sets up the call for the cellular WCD.

These as well as other aspects and advantages will become apparent to those of ordinary skill in the art by reading the following detailed description, with reference where appropriate to the accompanying drawings. Further, it should be understood that the descriptions in the foregoing summary and elsewhere herein are intended to be examples only, rather than necessary limitations of the claimed invention.

DETAILED DESCRIPTION OF AN EXEMPLARY EMBODIMENT

1. Base Network Architecture

Figure 1:
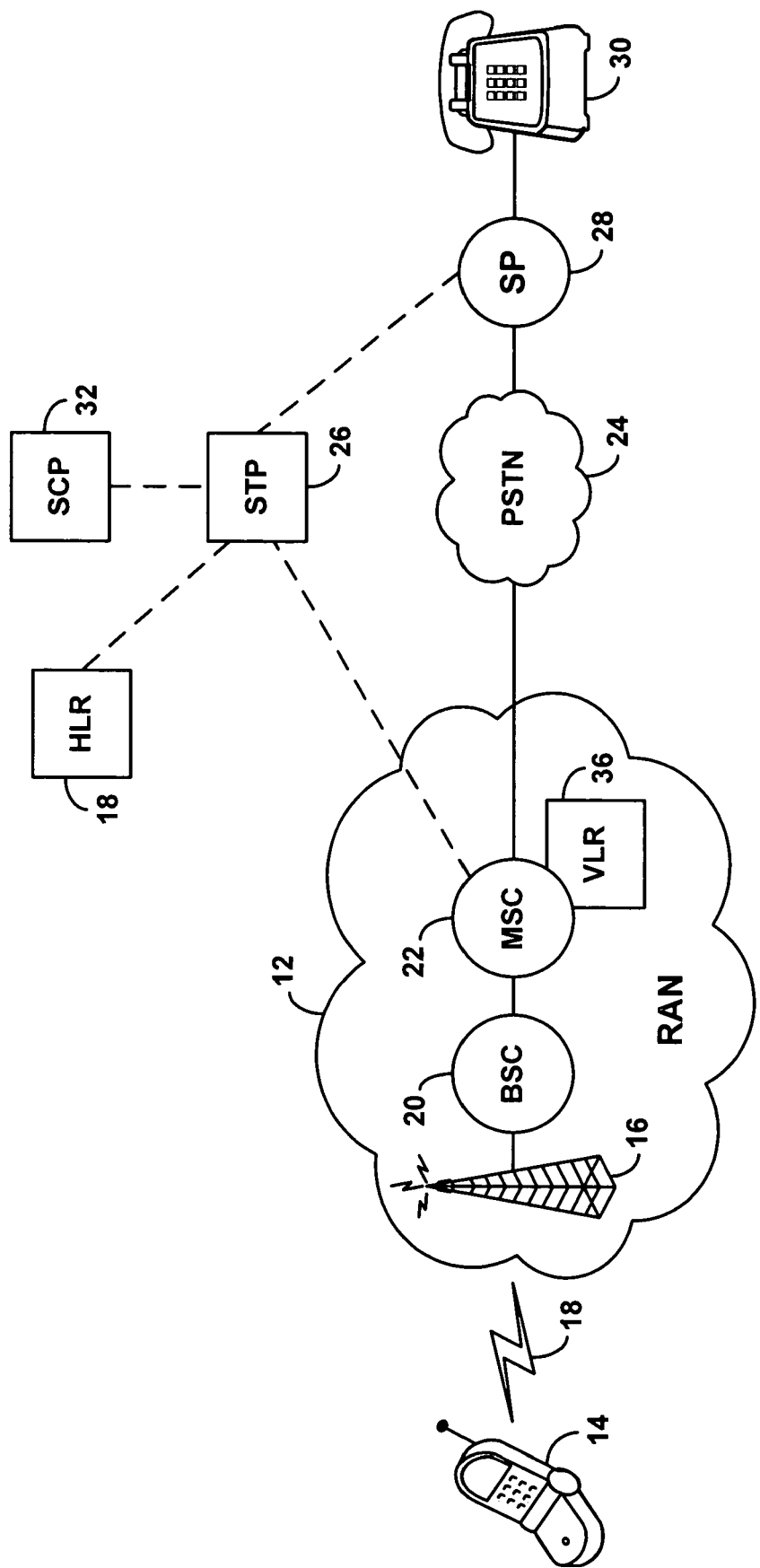
FIG. 1 is a block diagram of a prior art cellular wireless communication system.
Figure 2:
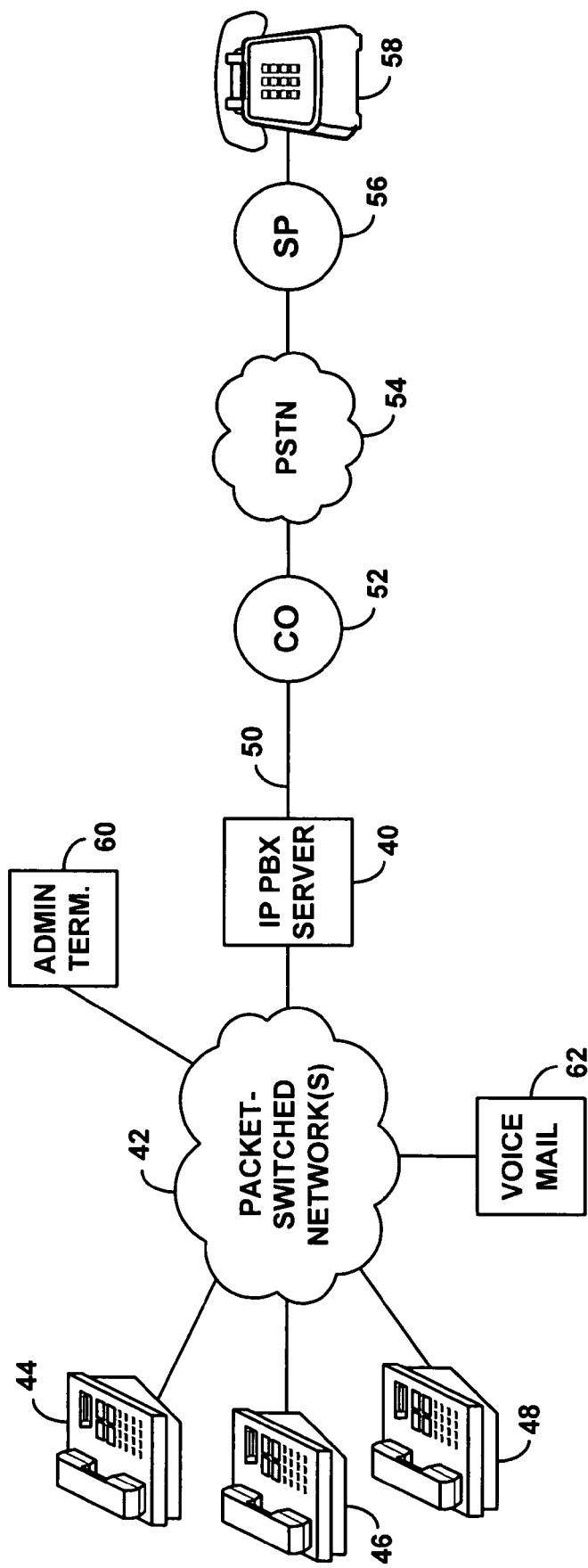
FIG. 2 is a block diagram of a prior art IP PBX system.

To provide some perspective for the invention, FIG. 1 is a block diagram depicting the arrangement of a basic cellular wireless communication system, and FIG. 2 is a block diagram depicting the arrangement of a basic IP PBX system. It should be understood, of course, that these are merely examples and that other arrangements of cellular wireless systems and IP PBX systems are equally possible.

a. Cellular Wireless Communication System

As shown first in FIG. 1, a typical cellular wireless communication system includes at its core a radio access network (RAN) 12, which serves one or more wireless communication devices, such as WCD 14 for instance. The RAN 12 includes a base transceiver station (BTS) 16, which radiates to define an air interface 18 through which WCD 14 can communicate, and a base station controller (BSC) 20 that manages air interface communications. Further, the RAN includes a mobile switching center (MSC) 22 or other switching point that provides connectivity with the PSTN 24.

MSC 22 is coupled with an out of band signaling network, represented in FIG. 1 by signal transfer point (STP) 26, through which MSC 22 can engage in signaling to set up calls, to obtain call processing guidance, to acquire profile logic for the WCDs that it serves. To set up a call over the PSTN, for instance, MSC 22 may conventionally engage in SS7 (Integrated Services Digital Network (ISDN) User Part, or "ISUP") signaling via STP 26 with a remote switching point (SP) 28 that serves a remote telephone device 30. To obtain call processing guidance, MSC 22 may send a query message via STP 26 to a service control point (SCP) 32 or other entity and may then receive a call-handling directive from that entity. To acquire profile logic for a served WCD, MSC 22 may receive a service profile for the WCD from a home location register (HLR) 34, via the STP 26, and MSC 22 may store that profile in a visitor location register (VLR) 36 for reference.

With this basic arrangement, WCD 14 can place and receive calls over PSTN 24. For instance, to place a call to remote telephone device 30, WCD 14 may send a call origination message over an access channel on air interface 18 to RAN 12, which would provide MSC 22 with dialed digits representing the telephone number of device 30.

Pursuant to logic defined generally for the MSC or logic defined specifically by the WCD's service profile, MSC 22 may then pause call processing and query up to SCP 32 to obtain call processing guidance. For instance, MSC 22 may send an IS-41 "Origination Request" (ORREQ) message via STP 26 to SCP 32, providing SCP 32 with the calling and called telephone numbers and any other pertinent information. SCP 32 may then apply service logic to decide how the call should be handled and send a call handling directive via STP 26 to MSC 22. And MSC may then carry out that directive.

In a normal case (absent some contrary directive), MSC 22 would direct BSC 20 to assign an air interface traffic channel over which WCD 14 can communicate. Further, MSC 22 would work to set up a call path to the called device 30, typically by engaging in SS7 ISUP signaling. For instance, MSC 22 may first send an ISUP "Initial Address Message" (IAM) via STP 26 to SP 28. SP 28 would then reserve a trunk for the call and send an ISUP "Address Complete Message" (ACM) via STP 26 to MSC 22, indicating the port/trunk reserved. MSC 22 would then connect the call through to that trunk and send a ringing tone to the calling WCD 14. When the called party answers (goes off hook), SP 28 would in turn send an ISUP "Answer Message" (ANM) to the MSC to complete call setup, and the call would then commence.

Similarly, if MSC 22 receives a signaling message (such as an IAM message) from SP 28 seeking to set up a call to WCD 14 from device 30, MSC 22 may query SCP 32 for call processing guidance, and, assuming the call should go through, MSC 22 may page WCD 14 over a paging channel on air interface 18 and may direct BSC 20 to assign a traffic channel through which WCD 14 can communicate. When WCD 14 answers the call, MSC 22 may signal back to SP 26 to complete setup of a call path through PSTN 24, so that the call can commence.

b. IP PBX System

As shown next in FIG. 2, a typical IP PBX system includes at its core an IP PBX server 40, such as one manufactured by Avaya Inc. (e.g., the "Communications Manager" platform), Cisco Systems, Inc. (e.g., the "Avid" platform), Nortel Networks, Ltd. (e.g., the "MCS" platform), or 3Com Corporation (e.g., the "NBX" platform), for instance. The IP PBX server 40 normally sits as a node on a packet-switched network 42, which typically comprises an enterprise local area network (LAN) but could take other forms as well.

Communicatively linked with the packet-switched network are then multiple end-user telephone stations, represented in FIG. 2 by devices 44, 46, 48, each of which may have an extension defined by IP PBX server 40. Each of these telephone stations may be a voice over IP (VoIP) telephony device (such as an IP telephone, IP fax machine, multi-media computer, media terminal adapter, analog terminal adapter, or other device) that is capable of engaging in packetized bearer and signaling communication with the IP PBX server 40 so as to communicate real time media such as voice, video or audio, or other data or information (e.g., fax or modem data) that is normally carried over a telephone line. Also linked with the packet-switched network is an enterprise voice mail server 62. The enterprise voice mail server 62 may be integrated as a function of the IP PBX server 40 or, as shown, may exist as a separate component.

IP PBX server 40 is coupled via one or more T1 lines, PRI lines, or other high capacity circuit link 50 with a local telephone company central office (CO) 52, which provides connectivity with the PSTN 54. In a usual arrangement, the link between IP PBX server 40 and CO 52 may carry multiple subscriber (local loop) telephone lines, each providing a direct dial line for the enterprise. Through this link and the IP PBX server 42, the enterprise telephone stations can place and receive calls over the PSTN.

IP PBX server 40 normally includes or has access to configuration data (not shown) for each of the enterprise telephone stations that it serves. For each station, the configuration data defines a PBX extension and other service parameters and preferences, such as preferences to have unanswered calls forwarded to the enterprise voice mail server 62, and the like. Further, the configuration data may correlate DID numbers with certain stations, so as to allow PSTN calls to be placed directly to those stations (rather than being placed to a main IP PBX number and from there being transferred to the stations).

One or more computer terminals sitting on the network 42 or coupled directly with IP PBX server may be used to provision the configuration data for the various telephone stations. For instance, an administrator terminal 60 may run a provisioning program or provide access to a web-based provisioning program, through which an administrator can set up and manage IP PBX configuration parameters for the various telephone stations.

In practice, the enterprise telephone devices will engage in signaling communication with the IP PBX server 40 using a proprietary or standard signaling protocol to set up and manage calls. By way of example, suitable protocols include H.323 and Session Initiation Protocol (SIP), each of which are well known. Using SIP, for instance, an enterprise telephone station could send an IP-based SIP "INVITE" message to the IP PBX server 40, in an effort to set up a call to another extension on the IP PBX server or a call to an outside telephone number.

If the call is an inside call, the IP PBX server 40 may then send a SIP INVITE in turn to the called station, to cause the station to ring. When the called station answers, the called station may respond to the IP PBX server 40 with a SIP "200 OK" message, and the IP PBX server 40 may in turn respond to the calling station with a SIP 200 OK message. After further SIP signaling, a VoIP (e.g., Real-time Transport Protocol) voice session would be set up between the calling and called stations, so that users of the stations can communicate with each other. If the call is an outside call, on the other hand, the IP PBX server 40 may forward (or allow pass-through of) the digits dialed by the calling station, via link 50, to CO 52, and CO 52 may set up the call over PSTN 54 to the called party.

During an ongoing call that an enterprise telephone station establishes through IP PBX server 40, a signaling path remains between the enterprise telephone station and the IP PBX server 40. Further, in some cases (such as with outside calls), the bearer path of the call also passes through the IP PBX server 40. Consequently, during an ongoing call, a user of the enterprise telephone station can invoke IP PBX functions, such as call transfer, conference calling, or the like.

As noted above, an IP PBX server 40 will sit as a node on one or more IP networks. Typically, for instance, the IP PBX server will sit as a node on an enterprise LAN and will be located physically at the enterprise premises. In that case, the enterprise will typically buy or lease the IP PBX server 40 and will manage operation of the server. Unfortunately, however, this can be a burden for the enterprise.

In an alternative arrangement, the IP PBX server 40 can be physically hosted and managed by a telecom carrier or other entity outside of the enterprise and can be coupled by a packet-data connection with the enterprise network. That way, the outside entity can provide IP PBX service for the enterprise, while relieving the enterprise of much of the responsibility for acquiring and managing an IP PBX server of its own. In this alternative arrangement, the network cloud 42 shown in FIG. 2 between the IP PBX server and the enterprise telephone stations may include both the enterprise network and one or more external IP networks or other communication links, such as the Internet and a telecom carrier's core packet-data network for instance.

In this alternative arrangement as well, the IP PBX server 40 may maintain configuration data for each of the enterprise telephone stations and may engage in signaling communication (e.g., SIP or H.323) with the enterprise telephone stations to set up and manage both inside and outside calls. Further, an administrator terminal 60 located at the enterprise network or elsewhere could be arranged to provision configuration data on the IP PBX server 42.

2. Enhanced Network Architecture

Figure 3:
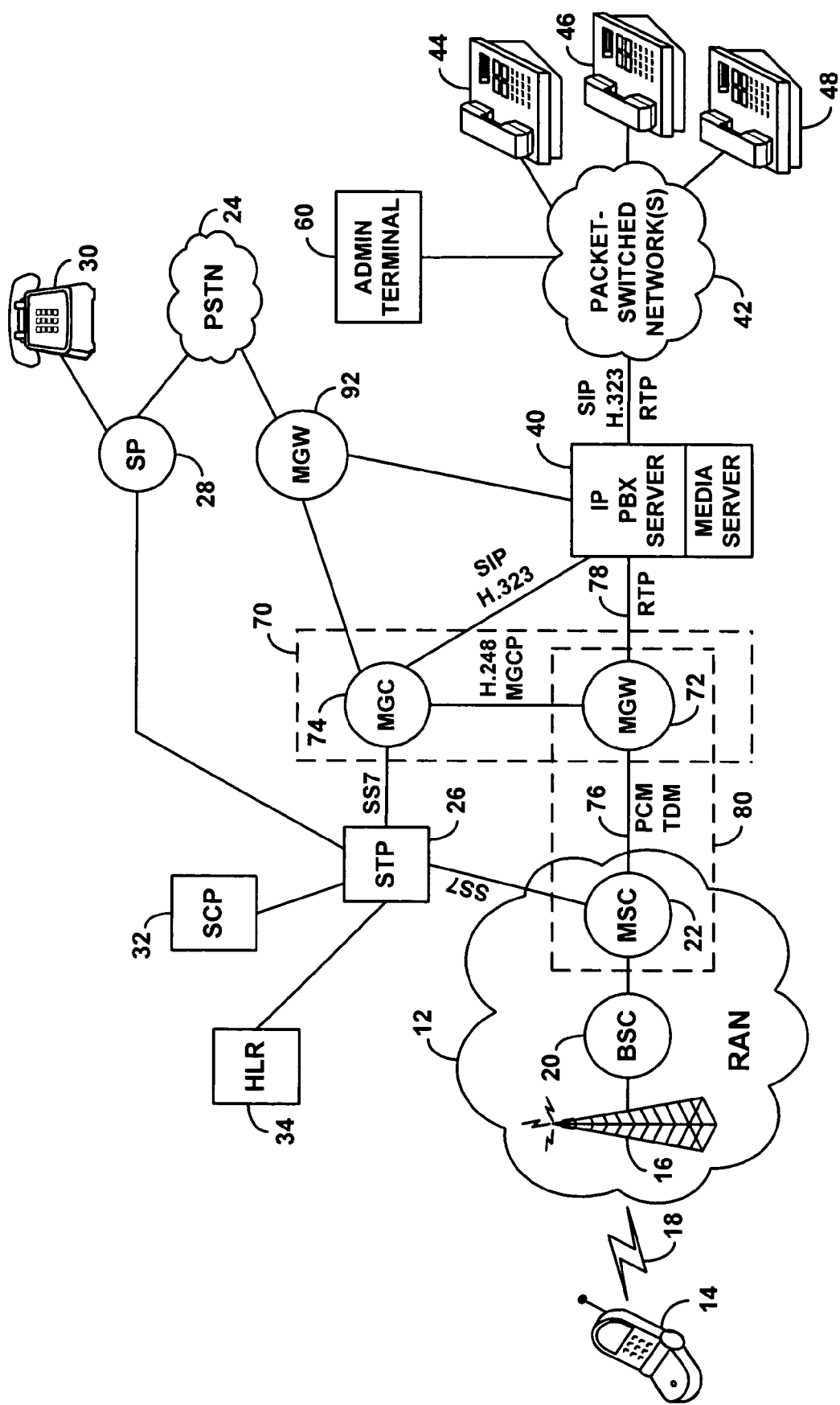
FIG. 3 is a block diagram of an example network arrangement for integrating an IP PBX system and cellular wireless communication system in accordance with an exemplary embodiment of the invention.

In accordance with the exemplary embodiment, an IP PBX system that serves enterprise telephone stations will be expanded to serve cellular wireless communication devices via a conventional cellular RAN. To accomplish this, as noted above, a signaling and bearer path infrastructure will be placed between the cellular carrier's RAN and the IP PBX system. Calls to and from cellular WCDs will then be connected through the IP PBX system (or at least with signaling passing through the IP PBX system), so that the IP PBX system can control and manage the calls just as the IP PBX system would control and manage calls involving other extensions on the IP PBX. FIG. 3 is a simplified block diagram depicting an example network arrangement for integrating an IP PBX system and a cellular wireless communication system in this manner. It should be understood, however, that other arrangements are possible as well.

As shown in FIG. 3, the network arrangement includes a media gateway system 70 that provides signaling and bearer path communications between a cellular carrier's RAN 12 and an IP PBX server 40. In a preferred embodiment, the media gateway system 70 includes a media gateway (MGW) 72, which converts between bearer data formats used in the PSTN (such as a pulse code modulated (PCM) format or another time division multiplex (TDM) format) and bearer data formats used for IP-based communication (such as a Real-time Transport Protocol (RTP) format). Further, the media gateway system 70 includes a media gateway controller (MGC) 74, which converts between signaling formats used to set up and manage calls in the PSTN (such as SS7 signaling) and signaling formats used to set up and manage calls over IP (such as SIP or H.323). MGW 72 and MGC 74 can be integrated together or can be distributed, and they can be programmed to communicate with each other through an accepted gateway control protocol such as H.248 or Media Gateway Control Protocol (MGCP) for instance. (Media gateway system 70 can take other forms as well. For instance, it could comprise a Parlay gateway or other entity that translates between legacy circuit-switched communications (e.g., SS7 signaling and TDM bearer traffic) and next generation (packet-switched) communications (e.g., SIP or H.323 signaling and RTP bearer traffic)).

As illustrated, a bearer communication path extends between MSC 22 and IP PBX server 40 via MGW 72. In particular, a circuit link 76 such as a PSTN voice trunk extends between MSC 22 and MGW 72, and a packet-link 78 such as an Ethernet line or packet-switched network extends between MGW 72 and IP PBX server 40. Bearer telephony traffic may therefore flow between MSC 22 and MGW 72 as PCM data or in any other form(s) in which bearer telephony traffic can flow between MSC 22 and another switching point on the PSTN. And bearer telephony traffic may flow between MGW 72 and IP PBX server 40 as RTP/IP data or in any other form(s) in which bearer telephony traffic can flow over a packet-switched network. MGW 72 would then operate to convert between these forms of bearer traffic so as to allow end-to-end bearer communication between the MSC 22 and the IP PBX server 40.

Similarly, a signaling path extends between MSC 22 and IP PBX server 40. In particular, an SS7 signaling path extends between MSC 22 and MGC 74 via STP 26, just as an SS7 signaling path would normally extend between MSC 22 and another PSTN switching point via STP 26. And an IP-based signaling path such as an Ethernet link or packet-switched network extends between MGC 74 and IP PBX server 40. SS7 signaling traffic may then flow between MSC 22 and MGC 74, and IP-based signaling traffic, such as SIP or H.323 traffic, may flow between MGC 74 and IP PBX server 40. MGC 74 would operate to convert between these forms of signaling traffic so as to allow end-to-end signaling communication between MSC 22 and IP PBX server 40.

(In an alternative arrangement, MGC 74 could send SS7 signaling messages over IP to MGW 72, and MGW 72 could then transpose those messages from an IP format into an SS7 format and send them along to STP 26. Similarly, STP 26 could route SS7 signaling messages to MGW 72, and MGW could convert those messages to an IP format and could send them to MGC 74.)

As further shown in FIG. 3, IP PBX server 40 may include or be connected with a media server (or, more generally, a media server function), to facilitate engaging in RTP or other bearer communication with MSC 22, via MGW 72. For instance, if the IP PBX server is an Avaya S8700 PBX server, the media server could be an Avaya G600 media server. The IP PBX server and media server can be separately coupled with the MGC 74, or they may have a common packet-data link (e.g., a common network or router connection) with the MGC 74.

In a preferred embodiment, the wireless carrier that owns and operates RAN 12 will position MGW 72 at the same physical site 80 as the MSC 22, so as to facilitate easy shunting of calls between the MSC 22 and the MGW 72. (As presently envisioned, a carrier that operates many MSCs may position a respective MGW 72 at each MSC site.) Further, the carrier may position the MGC 74 as a node on its core signaling network, so as to facilitate SS7 signaling between the MSC 22 and the MGC 74.

At each MSC site 80, for instance, the carrier may connect the MGW 72 by an inter-machine trunk (IMT) or primary rate interface (PRI) line to a switch port of MSC 22. Further, the carrier may couple the MGW 72 with a packet-data connection (e.g., Ethernet link, carrier's core packet network, Internet, etc.) to the MGC 74, to facilitate H.248, MGCP or other signaling between the MGW 72 and the MGC 74. Further, the carrier may couple the MGC 74 with a similar packet-data connection to the IP PBX server 40, to facilitate IP-based signaling communication between the MGC 74 and the IP PBX server 40. In addition, the carrier would couple the MGW 72 with a packet-data connection to the IP PBX server 40 (and/or media server), to facilitate bearer communication between the MGW 72 and the IP PBX server 40.

As noted above, an IP PBX server 40 can sit on the enterprise network or can be hosted outside of the enterprise. (As will be described below, an IP PBX system 40 can alternatively comprise both an IP PBX server on the enterprise network and an IP PBX server outside of the enterprise network.) In the scenario where the IP PBX server 40 resides on the enterprise network, the packet-data connection between the MGW 72 and the IP PBX server 40 could include the carrier's core packet network and the Internet or other link, and the packet-data connection between the MGC 74 and the IP PBX server 40 could similarly include the carrier's core packet network and the Internet or other link. Further, the enterprise network would provide packet-data connectivity between the IP PBX server 40 and the enterprise telephone stations.

In the scenario where the IP PBX server 40 is hosted outside of the enterprise network, such as on the carrier's core packet network for instance, the packet-data connections between the MGW 72 and the IP PBX server 40 and between the MGC 74 and the IP PBX server 40 could similarly be the carrier's core network or could take some other form. Further, the carrier would couple IP PBX server with a packet-data connection (including, for instance, the carrier's core network and the Internet) to the enterprise network, so that the IP PBX server 40 can engage in IP-based signaling and bearer communication with the enterprise telephone stations and/or other entities on the enterprise network.

Each of the entities shown in FIG. 3 will preferably be configured with logic to facilitate operation of the invention. By way of example, each entity may include or have access to one or more processors (e.g., general purpose and/or special purpose processors), one or more data storage elements (e.g., volatile and/or non-volatile storage), and one or more communication interfaces (e.g., Ethernet network interface modules, or other interfaces) to facilitate communication over the various links shown. The data storage of each entity may include reference data and/or program instructions (e.g., machine language instructions) executable to carry out various functions described herein. Alternatively, the entities can include hardware or firmware, or any combination of hardware, firmware, and/or software, to carry out the various functions.

HLR 34, for instance, may include or have access to a profile record or other service logic for WCD 14. The profile record or other service logic may define wireless intelligent network (WIN) trigger logic for causing MSC 22 to query SCP 32 for call processing guidance when MSC 22 is faced with a request to set up a call for WCD 14. Conventionally, HLR 34 would send such logic to MSC 22 (e.g., in an IS-41 registration notification response or qualification directive) for storage in VLR 36, when WCD 14 registers in the service area of MSC 22, when the logic in HLR 34 gets updated, or at other times.

SCP 32 may similarly include or have access to a profile record or other service logic for WCD 14. The profile record or other service logic in SCP 32 may indicate that, when MSC 22 is faced with a request to set up a call for WCD 14, MSC 22 should set up the call to media gateway system 70, i.e., by engaging in SS7 signaling with MGC 74. As will be explained below, the logic in SCP 32 may also indicate that, if a call to WCD 14 has already been routed to IP PBX server 40 and back to MSC 22, the call should not again be routed to IP PBX server 40 (to avoid endless looping).

Media gateway system 70, and particularly MGC 74, may similarly include or have access to a profile record or other logic for WCD 14. Preferably, the profile record or other logic would include routing logic or other correlation data that correlates WCD 14 with IP PBX server 40 or that otherwise indicates that IP PBX server 40 serves WCD 14. That way, when MGC 74 is faced with a request to set up a call to or from WCD 14, MGC 74 could refer to that correlation data and thereby determine (based on an identifier of WCD 14 provided in the request) that the call should be set up to IP PBX server 40. In the preferred embodiment, the correlation data can correlate (i) a WCD identifier (e.g., mobile identification number, mobile directory number, electronic serial number, etc.) that would be provided in the call setup signaling from MSC 22 with (ii) a network address (e.g., SIP address, IP address, network access identifier, etc.) of IP PBX server 40 to which MGC 74 can send call setup signaling.

IP PBX server 40, as well, may include or have access to profile data or service logic for WCD 14. In a preferred embodiment, the profile data or service logic of IP PBX server 40 would define configuration data for WCD 14, which would assign an IP PBX extension number to the WCD 14, and which would correlate the extension number with the directory number (e.g., mobile directory number) of the WCD 14. As with the configuration data for more conventional IP PBX extensions (e.g. traditional enterprise telephone stations), the configuration data for WCD 14 may define service preferences, such as whether to forward calls to voice mail and the like. Thus, when IP PBX server 40 is faced with a request to set up a call to or from WCD 14, IP PBX server 40 can apply those service preferences or other logic as it would for a call being placed to or from any other one of its extensions.

The configuration data for WCD 14 may also correlate the extension of WCD 14 with another extension on IP PBX server 40. For instance, if an enterprise user normally uses a particular desk phone when at work (on the enterprise network) but uses WCD 14 when on the road, the configuration data for WCD 14 can correlate the extension of WCD 14 with the extension of the user's desk phone. That way, when IP PBX server 40 is faced with a request to set up a call to or from WCD 14, IP PBX server 40 can programmatically set up the call to both WCD 14 and the user's desk phone extension, either simultaneously ringing both phones (and connecting with the one that answers first) or sequentially ringing both phones.

The configuration data for WCD 14 will be marked or have a characteristic of some kind that indicates IP PBX server 40 should handle calls for WCD 14 in a special way. For instance, the configuration data could be flagged (e.g., by the mere existence of a mobile directory number in the configuration data) to indicate that the WCD 14 is a WCD, and could indicate a network address of the MGC 74 to which call setup signaling can be sent for WCD 14. (This can advantageously allow a given IP PBX server to extend its service to WCDs served by more than one wireless carrier, or through more than one media gateway system.)

Thus, for instance, when the IP PBX server 40 is faced with a request to connect a call to WCD 14, the IP PBX server 40 may determine based on the WCD's configuration data that the IP PBX server 40 should simultaneously set up the call to both the WCD 14 (via media gateway system 70 and RAN 12) and to the WCD user's desk phone on the enterprise network. As another example, when the IP PBX server 40 is faced with a request to connect a call from the WCD 14, the IP PBX server 40 may determine based on the WCD's configuration data how to handle the call and may handle the call accordingly.

Figure 4:
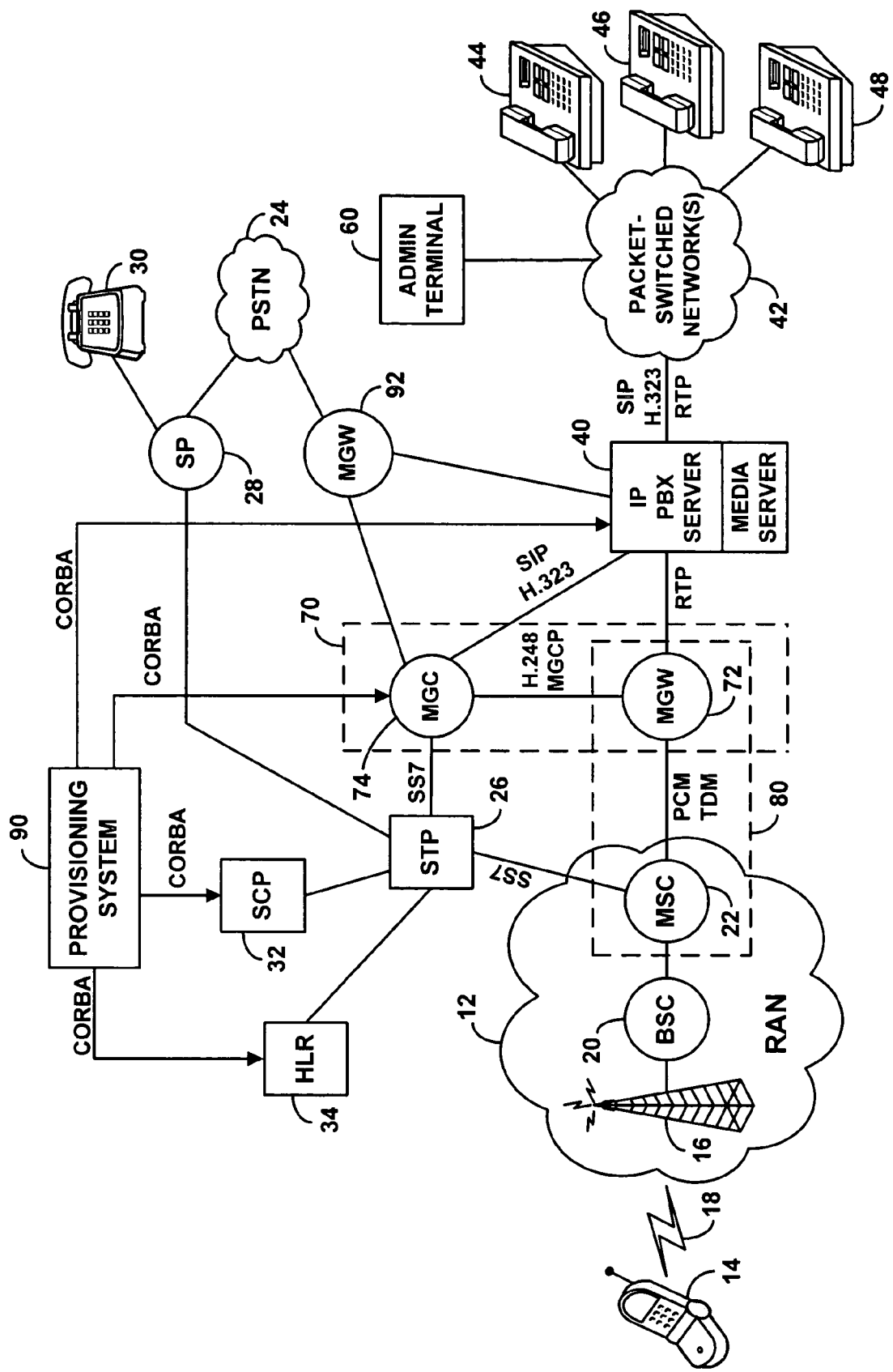
FIG. 4 is a block diagram like FIG. 3, further depicting a provisioning system for configuring entities of the network.

As shown in FIG. 4, a provisioning system 90 may be in place to centrally configure HLR 34, SCP 32, MGC 72, and IP PBX server 40 (as well as any other desired entities) with service settings to facilitate operation of the invention. The provisioning system 90 can include a computer server (such as an "Actiview" server) that sits on the carrier's core network and that is programmed to communicate directly or through one or more other service provisioning interfaces (e.g., service management systems, enhanced service managers, etc.) with the various entities to be provisioned. In a preferred embodiment, the provisioning server would engage in industry standard CORBA signaling to convey provisioning updates to the various entities. Further, the administrator terminal 60 or another user terminal can be communicatively linked with the provisioning system 90 (e.g., through a web interface) so as to allow an administrator or other user to configure IP PBX services for WCD 14.

The exemplary arrangement generally depicted in FIGS. 3 and 4 can be expanded to support multiple IP PBX servers, so that multiple IP PBX systems can serve cellular WCDs via a common cellular carrier. To accomplish this in a preferred embodiment, the routing logic or other correlation data used by media gateway system 70 can correlate each of a plurality of WCDs with a respective IP PBX server that serves the WCD (i.e., the IP PBX server on which the WCD is an extension). When the MGC 74 is faced with a request from MSC 22 to set up a call to or from a given WCD, the MGC 74 may then programmatically reference the correlation data to determine which IP PBX server serves the WCD, and the MGC 74 may then engage in signaling with that IP PBX server in order to set up the call to or through the IP PBX server.

Figure 5:
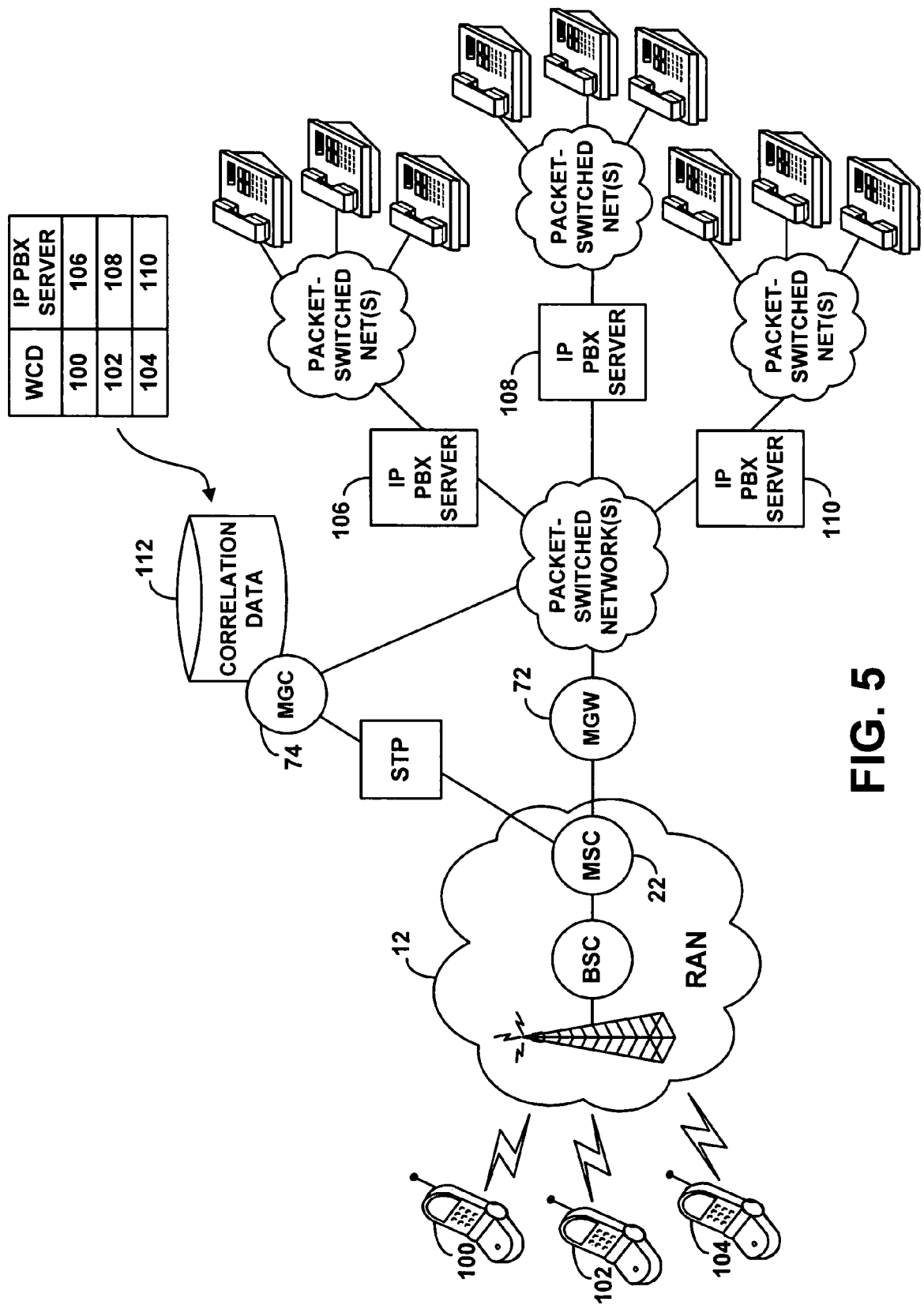
FIG. 5 is a block diagram of an example network arrangement through which a cellular carrier can provide support for WCD extensions of multiple IP PBX systems.

FIG. 5 depicts an example arrangement for carrying out this function. As shown, the example arrangement includes several WCDs 100, 102, 104 and several IP PBX servers 106, 108, 110, all of which are coupled by a packet-data link (e.g., network) with MGC 74 and with MGW 72. Each IP PBX server, in turn, is shown coupled by a packet-data network with a plurality of enterprise telephone stations. For instance, each IP PBX server may reside on a respective enterprise network, and each enterprise network may have its own respective set of enterprise telephone stations that are extensions on its IP PBX server. Alternatively, each IP PBX server may reside in a carrier's core network and can function as a host IP PBX server for one or more enterprise networks, coupled by packet-data links with the enterprise networks that they serve. Still alternatively, some of the IP PBX servers may reside on enterprise networks and others may be host IP PBX servers that reside on a carrier's network or elsewhere.

As further shown in FIG. 5, MGC 74 includes or has access to correlation data (e.g., routing data) 112, which correlates WCDs with IP PBX servers. As shown, for instance, the correlation data may take the form of a table of data, in which each record has a WCD identifier field and an IP PBX server identifier field. Each WCD identifier can be a WCD directory number (telephone number), a WCD serial number (e.g., ESN), or some other identifier that would be conveyed in SS7 call setup signaling from MSC 22 or that can be derived from such signaling. Each IP PBX serer identifier can be a SIP address, an IP address, a network access identifier, or some other identifier that can be used as a basis to route IP-based call setup signaling messages to the IP PBX server. In a preferred embodiment, this data would be provisioned on MGC 74 by provisioning system 90 as depicted in FIG. 4.

Thus, for instance, when MGC 74 receives a request from MSC 22 seeking to set up an call placed to or from WCD 100, MGC 74 may determine by reference to correlation data 112 that IP PBX server 106 serves the WCD, and so MGC 74 may set up the call to IP PBX server 106 for handling. On the other hand, when MGC 74 receives a request from MSC 22 seeking to set up a call placed to or from WCD 102, MGC 74 may determine by reference to correlation data 112 that IP PBX server 108 serves the WCD, and so MGC 74 may set up the call to IP PBX server 108 for handling.

3. Example Call Setup Signaling

Advantageously, while WCD 14 is being served by the cellular carrier's RAN 12, WCD 14 can function as an extension of IP PBX server 40, so as to benefit from many or all of the same IP PBX services that enterprise telephone stations 44, 46, 48 enjoy. Consequently, the enterprise can extend its off the shelf IP PBX system to serve not only traditional IP PBX telephone stations but also mobile WCDs such as WCD 14.

The following subsections describe various functions that can be carried out in accordance with the invention, with reference to the network architecture of FIGS. 3 and 4 and the message flow diagrams of FIGS. 6-9. It should be understood, however, that many variations from these functions are possible as well.

a. Originating Inside Calls

Figure 6:
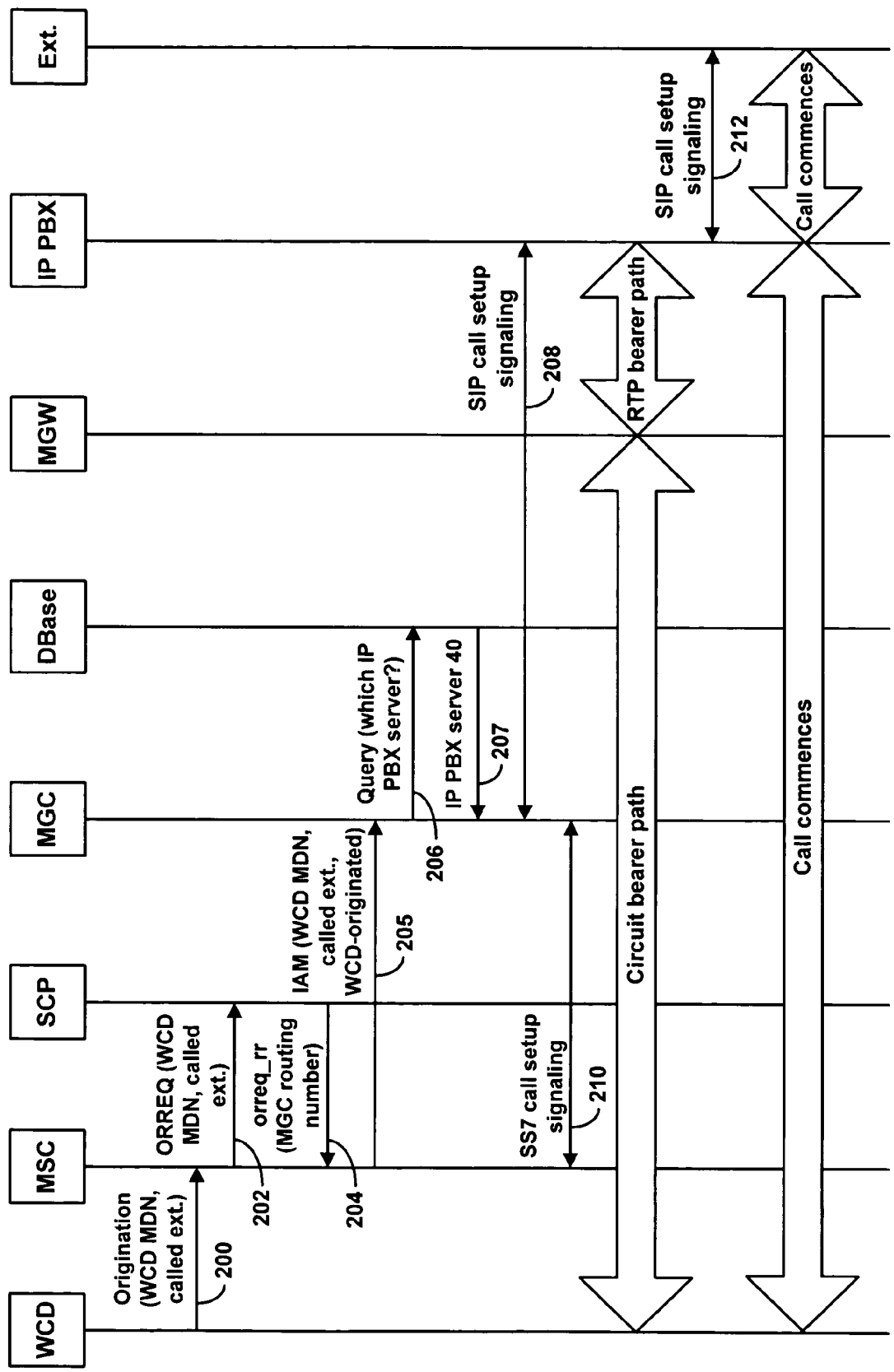
FIGS. 6-9 are message flow diagrams depicting call setup signaling in accordance with the exemplary embodiment.

In a first scenario, as illustrated in FIG. 6, assume that WCD 14 places a call to another extension on the enterprise network, by dialing the extension number. To dial an extension number from a conventional cellular WCD (e.g., cell phone), a user would enter the extension number and press "SEND" or another key. At step 200, an origination message will then pass over an air interface from WCD 14 to MSC 22 in the carrier's RAN 12, providing the RAN with (i) the WCD's mobile directory number (MDN) and electronic serial number (ESN) or one or more other identifiers, and (ii) the dialed digits, which, in this case, would be the dialed PBX extension rather than a full directory number.

Upon receipt and processing of the origination message, the MSC may then encounter a WIN trigger that points to the SCP. Thus, at step 202, the MSC would send an IS-41 "Origination Request" (ORREQ) message via the signaling network to SCP 32, providing the SCP with the calling and called numbers. SCP 32 may then refer to a subscriber profile store to determine that the WCD originating the call subscribes to IP PBX service. Thus, at step 204, the SCP will send an Origination Request return result (orreq_rr) to MSC 22, providing the MSC with the routing number of MGC 74, so as to cause MSC 22 to set up the call to the media gateway system.

At step 205, MSC 22 would then send an ISUP IAM call setup message via the signaling network to MGC 74, providing the MGC with the calling and called numbers, and indicating that the call is a WCD-originated call. (Existing call signaling protocols define a parameter that can be used to indicate whether a call is a WCD-originated call (a call from a WCD) or a WCD-terminated call (a call to a WCD), for purposes of allowing a call processing entity to determine which party's profile to reference when setting up the call.) In this instance, given that the call is WCD-originated, the MGC may then dip into correlation data 112 to determine which host IP PBX server serves the originating cellular WCD (e.g., based on its MDN), at step 206. The MGC may thereby get an IP address or SIP address of the applicable IP PBX server, presumably IP PBX server 40, at step 207.

In turn, MGC 74 may then work on behalf of MGW 72 to set up a voice/RTP call leg between MGW 72 and the selected IP PBX server 40 and a circuit-switched (e.g., PCM) call leg between MSC 22 and the MGW 72. In particular, for instance, MGC 74 could engage in SIP or H.323 signaling with the host IP PBX server, at step 208, to set up a voice/RTP session between the MGW 72 and the IP PBX server 40, and MGC 74 could engage in further ISUP signaling with MSC 22, at step 210, to set up a circuit call leg between MSC 22 and MGW 72.

At this point, IP PBX server 40 has thus received a signaling message seeking to set up a call from WCD 14 to another IP PBX extension. Further, the IP PBX server 40 has a communication bearer path with WCD 14, via the RTP leg, MGW 72, the circuit leg, MSC 22, and cellular air interface 18. Thus, IP PBX server 40 can apply the enterprise dial plan and thereby determine that this is a call to one of the enterprise IP PBX extensions.

In response to the determination that this is a call to an enterprise IP PBX extension, the IP PBX server 40 may then set up the call with SIP and RTP to the enterprise telephone station having that extension, at step 212. For instance, if the IP PBX server 40 sits on the enterprise network, the IP PBX server 40 may engage in SIP communication with the called station to set up an RTP call path between the IP PBX server 40 and the called station. Or if the IP PBX server 40 sits outside of the enterprise network, on the carrier's core network for instance, the IP PBX server can similarly engage in SIP communication with the called station, via a packet-data link with the enterprise network, and via the enterprise network, to set up an RTP call path between the IP PBX server 40 and the called station.

Upon successful connection of the call between WCD 14 and the called enterprise IP PBX extension, both the signaling and bearer paths would flow through the IP PBX server 40. Thus, the IP PBX server 40 can conveniently manage the call, providing IP PBX features such as call transfer, conference calling, and the like for WCD 14.

On the other hand, if the IP PBX server 40 determines for some reason (such as based on the enterprise dialing plan or the WCD's configuration data) that the call cannot be connected through to the called party, the IP PBX server 40 (or its associated media server) could play a speech or tone announcement to the caller, via the established bearer path.

b. Originating Outside Calls

Figure 7:
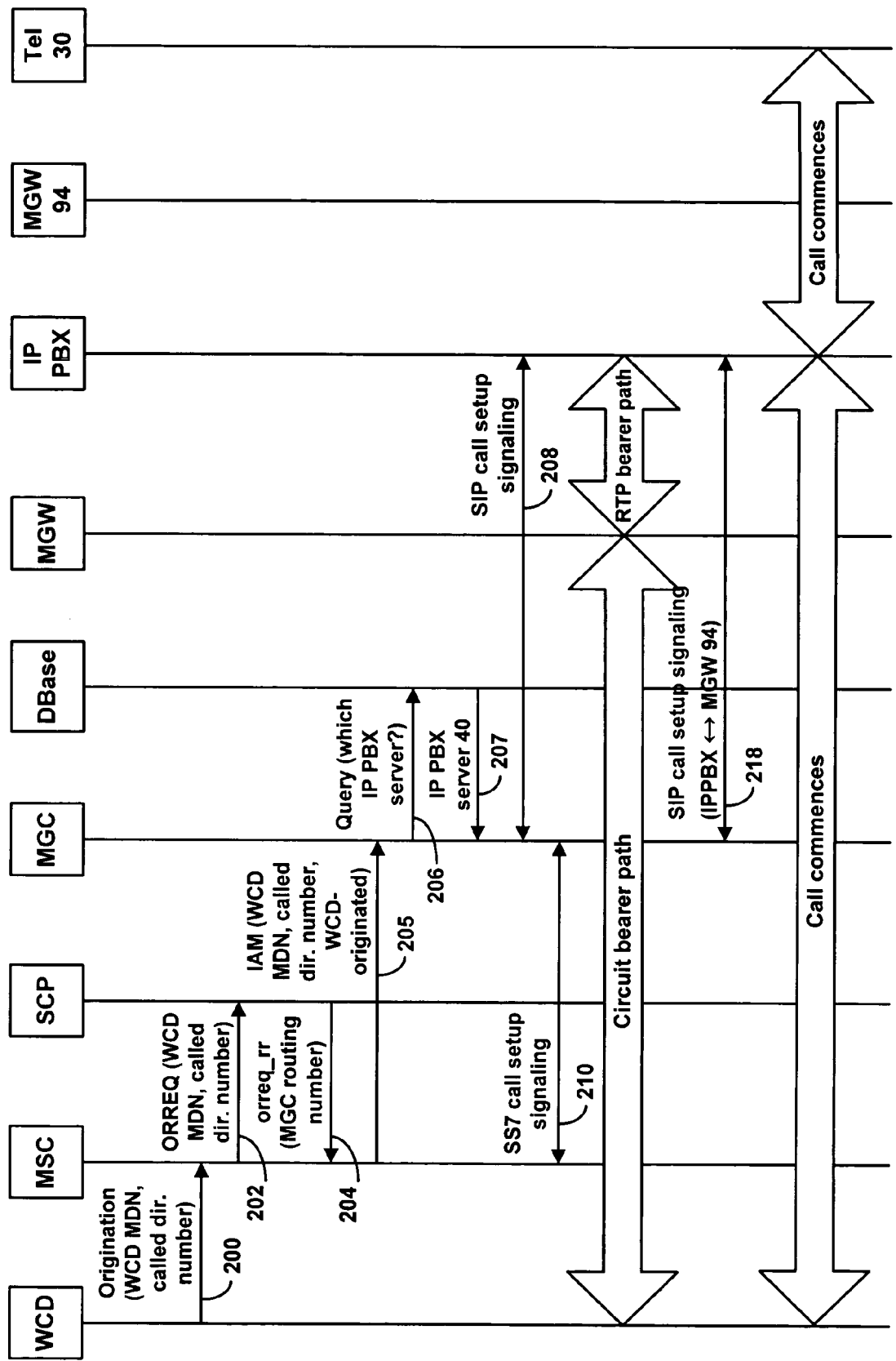

In the next scenario, as illustrated in FIG. 7, assume that WCD 14 places a call to a PSTN phone number, i.e., to a full PSTN number rather than an IP PBX extension, such as the phone number of telephone 30 for instance. (The PSTN number could be a DID number in the enterprise, but that does not matter.) This scenario is largely the same as the scenario described above, up until the point where a call path (or associated signaling) is established to the IP PBX system, e.g., to the IP PBX server 40, except that the dialed digits represent a full directory number rather than an abbreviated PBX extension.

In the preferred embodiment, once the IP PBX server 40 receives the call setup request, the IP PBX server 40 may analyze the request and thereby determine that it is a call to a PSTN number. (For instance, the fact that the dialed digits are the length or other form of a full directory number rather than the length or form of a simple extension number may indicate that the call is a call to a PSTN number rather than to an IP PBX extension.) In response, the IP PBX server 40 may then set up the call via a PSTN gateway. For instance, at step 218, the IP PBX server 40 may engage in SIP signaling with MGC 74 to set up an RTP call leg between the IP PBX server 40 and another MGW 92 tied to the PSTN 24, and MGC 74 may correspondingly engage in SS7 ISUP signaling (e.g., via STP 26, with SP 28) to set up the call from that MGW 92 via the PSTN 24 to the dialed number (telephone 30). (Alternatively, IP PBX sever 40 could set up the call to the outside number via a local telephone company switch.)

Advantageously, the call could thus proceed between WCD 14 and the called PSTN number, similarly leaving both signaling and bearer paths through the IP PBX server 40. The IP PBX server 40 could thus manage the outside call, to similarly provide IP PBX services, such as call transfer, conference calling, and the like.

c. Terminating Outside Calls

Figure 8A:
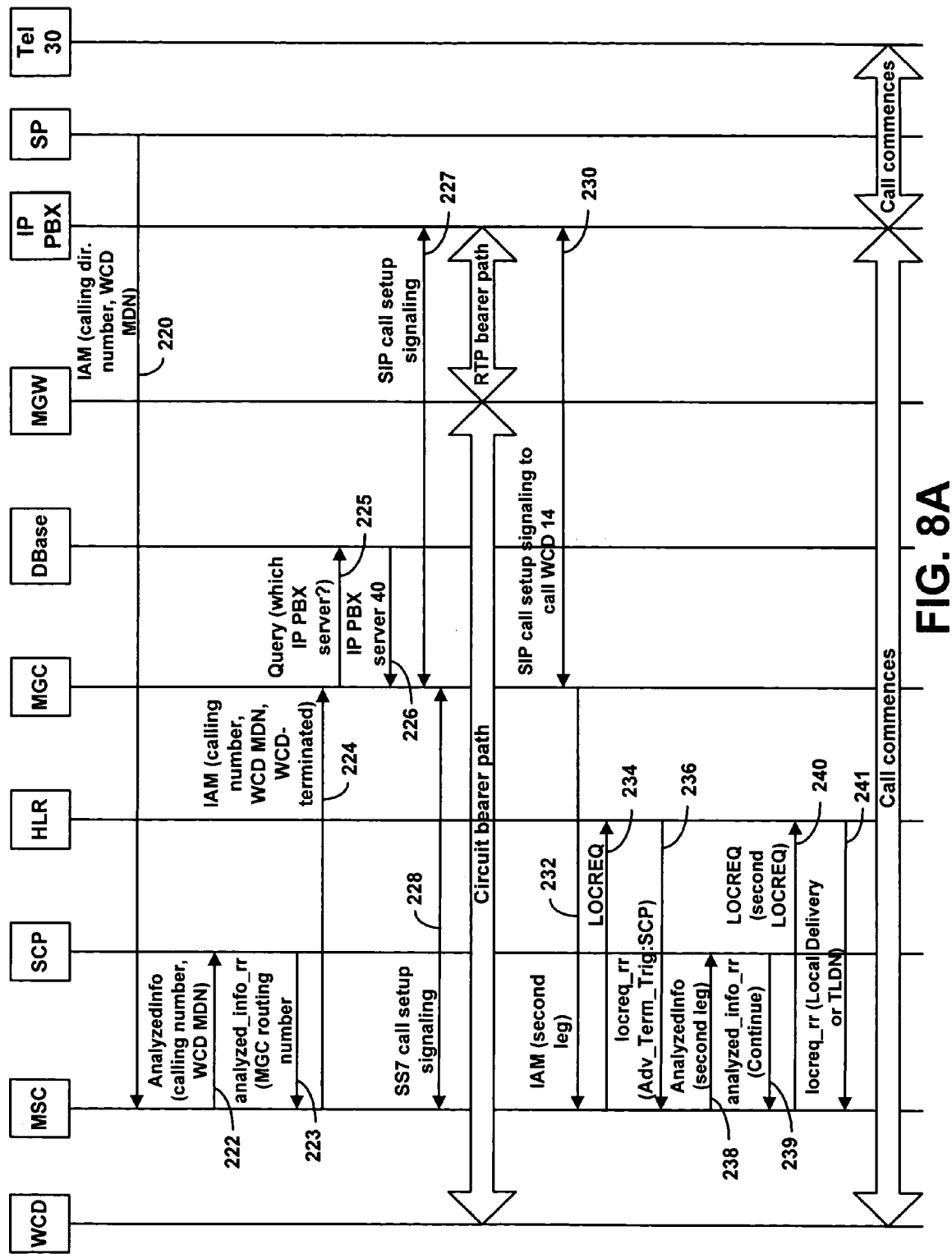
Figure 8B:
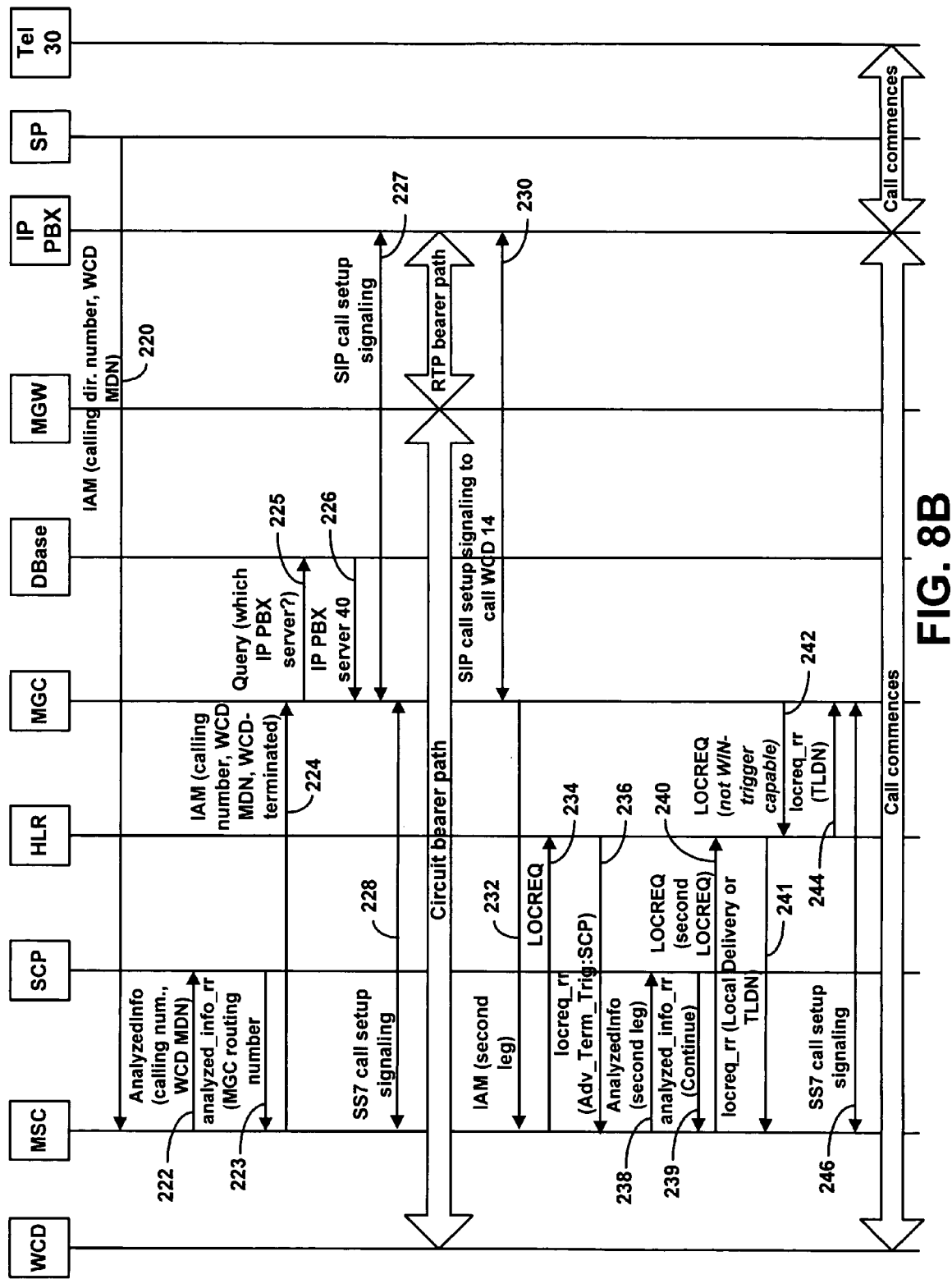

In this next scenario, as illustrated in FIGS. 8A and 8B, assume that MSC 22 receives a request to connect an outside call (i.e., a call from a PSTN directory number) to WCD 14, at step 220. For instance, MSC 22 may receive an ISUP IAM request from another switching point (e.g., SP 28) in the PSTN 24, seeking to set up a call to the directory number of WCD 14. (The call could come as a PSTN call from an outside line on the enterprise IP PBX system, but that does not matter.)

Upon receipt of the call setup message, the MSC may then encounter a WIN trigger that points to SCP 32. Thus, at step 222, MSC 22 may send an IS-41 "AnalyzedInfo" message via the signaling network to the SCP, providing the SCP with the calling and called numbers. SCP 32 may then refer to a subscriber profile store to determine that the WCD being called subscribes to IP PBX service. Thus, at step 223, SCP 32 may send an AnalyzedInfo return result to MSC 22, providing the MSC with the routing number of MGC 74, to cause MSC 22 to set up the call to the media gateway system.

MSC 22 would then send an ISUP IAM call setup message via STP 26 to MGC 74, providing MGC 74 with the calling and called numbers, and indicating that the call is a WCD-terminated call, at step 224. Given that it is a WCD-terminated call, the MGC may then dip into its correlation data 112 to determine which host IP PBX server serves the terminating WCD 14 (e.g., based on its MDN), at step 225. MGC 74 may thereby get an IP address or SIP address of the applicable IP PBX server, presumably IP PBX server 40, at step 226.

In turn, as above, MGC 74 may then work on behalf of MGW 72 to set up an RTP call leg between MGW 72 and the selected IP PBX server 40 and a circuit-switched (e.g., PCM) call leg between MSC 22 and MGW 72. In particular, MGC 74 could engage in SIP signaling with IP PBX server 40, at step 227, to set up an RTP session between MGW 72 and IP PBX server 40, and MGC 74 could engage in further SS7 signaling with MSC 22, at step 228, to set up a circuit call leg between MSC 22 and MGW 72.

At this point, the IP PBX server 40 has thus received a signaling message seeking to set up a call to WCD 14. Further, the IP PBX server 40 has a communication bearer path with WCD 14, via the RTP leg, MGW 72, the circuit leg, MSC 22, and cellular air interface 18. Thus, the IP PBX server 40 can apply the enterprise dial plan to determine how to handle the call.

Possible options for handling the call might include (i) ringing the WCD 14, (ii) simultaneously or sequentially ringing the WCD 14 and a corresponding desk phone extension at the enterprise, or (iii) sending the call to the WCD's voice mail box at the enterprise IP PBX (or on the enterprise network). General logic, or configuration data for WCD 14, for instance, may indicate which of these or other options the IP PBX server 40 should take. In an exemplary embodiment, for instance, IP PBX server 40 might first ring WCD 14 and then, if no one answers, send the call to voice mail or ring another enterprise extension. These various options are discussed in the following subsections.

i. Ringing the Cellular WCD

When the IP PBX server 40 decides to connect a call to the WCD 14, the IP PBX server 40 may effectively initiate an outbound call (call leg) to the WCD 14, via the media gateway system 70 and the RAN 12. To do so, the IP PBX server 40 could engage in SIP signaling with MGC 74, sending a SIP INVITE that seeks to set up a call to the directory number of WCD 14 (which the IP PBX server 40 had received in the call setup message from the MGC 74), at step 230. At that point, one of two processes (among various others) could be applied.

In one process, as shown in FIG. 8A, MGC 74 could send an ISUP IAM to the WCD's home MSC, at step 232. (Routing logic maintained or accessible by the MGC can correlate the directory number of WCD 14 with the home MSC.) In the exemplary embodiment, the MGC would include in the IAM an indication that this is the second leg of the call, or some other indication that the call has already been routed to the IP PBX system for handling, so as to avoid endless looping. The indication could be a user definable parameter in the IAM message, provided that the home MSC (or SCP, if queried by the home MSC) would be programmed to interpret the parameter value as the indication. Upon receipt of the IAM, the home MSC would then encounter a WIN trigger that would cause the home MSC to send an IS-41 "LocationRequest" (LOCREQ) message to the WCD's HLR 34, at step 234. And the HLR 34 then would return to the home MSC a Location-Request return result (locreq_rr) that provides Advanced Termination Trigger directing the home MSC to send an AnalyzedInfo message to the SCP 32, at step 236.

At step 238, the home MSC would thus send an AnalyzedInfo message to the SCP 32, with an indication that this is a second leg of a call (based on the indication it received from MGC 74). And, due to that indication, the SCP 32 would send a "Continue" return result to the home MSC, at step 239. The home MSC would then send another LOCREQ to the HLR to find out where the called cellular WCD is currently located, at step 240. Preferably, this second LOCREQ would include a trigger value that indicates this is a second LOCREQ and that the WCD location is to be determined, to preclude the HLR 34 from again providing an Advanced Termination Trigger.

If WCD 14 is in the home MSC's serving system (i.e., if MSC 22 is the home MSC), then the HLR would return a locreq_rr providing a "Local Delivery" result, and so the MSC 22 would page/ring the cellular WCD and, if someone answers, connect the call through to the cellular WCD, at step 240. Alternatively, if the WCD is in another MSC's serving system (i.e., if MSC 22 is not the home MSC), then the HLR would send a RouteRequest (ROUTEREQ) to the serving MSC 22 and the MSC 22 would return a RouteRequest return result (routereq_rr) providing a temporary local directory number (TLDN) to use for setting up the call to the cellular WCD. The HLR would then send a locreq_rr to the home MSC, providing the TLDN, and the home MSC would set up the call to the cellular WCD at that TLDN, i.e., via MSC 22.

In another process, as illustrated in FIG. 8B, instead of MGC 74 signaling to the WCD's home MSC and the home MSC 22 signaling to the HLR 34 to find out where WCD 14 is located, the MGC 74 could itself send a LOCREQ to the HLR 34 in an effort to get a TLDN to which the MGC 74 can route the outbound call to WCD 14, at step 242.

A problem with doing this normally would be that, like the home MSC as described above, the MGC 74 would receive a locreq_rr that provides the MGC 74 with an Advanced Termination Trigger pointing to the SCP 32. To avoid this, according to a preferred embodiment of the invention, MGC 74 could include in its LOCREQ to HLR 34 a parameter (or lack thereof) indicating that the MGC 74 is not WIN-trigger capable. As a result, HLR 34 would not return an Advanced Termination Trigger but would instead proceed to send a ROUTEREQ to the WCD's serving MSC 22 so as to obtain a TLDN for the WCD. And HLR 34 would then send the TLDN to MGC 74 in a locreq_rr, at step 244. Given the TLDN, MGC 74 could then engage in ISUP signaling with the WCD's serving MSC 22, at step 246, to set up the call to WCD 14 at that TLDN, i.e., via MSC 22.

(Another way for MGC 74 to avoid receiving an Advanced Termination Trigger from HLR 34 in response to a LOCREQ is for MGC 74 to indicate in the LOCREQ that it is WIN-trigger capable, but to provide a trigger-type of "location" rather than a trigger-type of "mobile termination." Given that the trigger-type is "location," HLR 34 would respond by providing a TLDN rather than providing an Advanced Termination Trigger.)

Once the call is connected to WCD 14, bearer and signaling paths would again remain through the IP PBX server 40. Thus, once again, the IP PBX server 40 could manage the call, providing IP PBX services, such as call transfer, conference calling, and the like.

ii. Ringing Another IP PBX Extension

When the IP PBX server 40 decides to ring another IP PBX extension, the IP PBX server can simply engage in SIP signaling with the enterprise IP PBX server so as to work to set up the call to the desired extension, in the manner described above for inside call originations. The IP PBX server might do this after failing to connect the call to WCD 14. Alternatively, the IP PBX server 40 might do this at the same time as it seeks to connect the call to WCD 14, perhaps to simultaneously ring WCD 14 and the desk telephone of the WCD's user. In that case, the IP PBX server could connect the call through to whichever one answers the call first.

ii. Sending the Call to Voice Mail

If desired, the IP PBX server 40 could send the call to the WCD's voice mail box at the enterprise IP PBX system. To do so, the IP PBX server 40 could engage in SIP signaling with the voice mail server or with another entity to connect the call to the voice mail server.

d. Terminating Inside Calls

Figure 9:
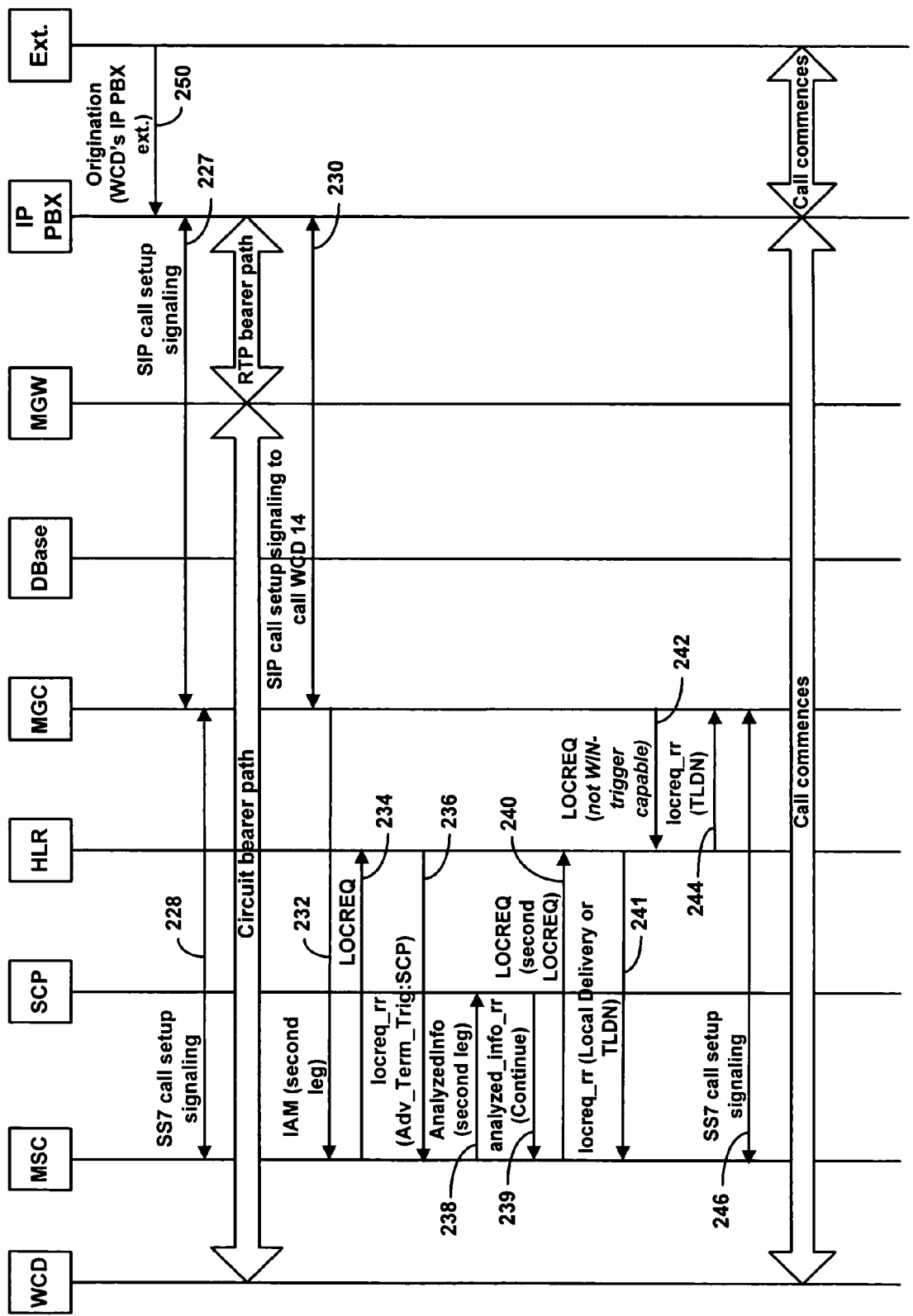

In this final scenario, as illustrated in FIG. 9, assume that another extension of the enterprise IP PBX system dials the extension that the IP PBX system has assigned to WCD 14, at step 250. When that happens, the IP PBX server 40 can determine how to handle the call. Possible handling options include, for instance, (i) ringing the cellular WCD, (ii) simultaneously or sequentially ringing the cellular WCD and a corresponding desk phone extension at the enterprise, or (iii) sending the call to the WCD's voice mail box on the enterprise IP PBX system. These options are discussed in the following subsections.

i. Ringing the Cellular WCD

To ring WCD 14, the IP PBX server 40 can engage in SIP signaling with MGC 74, and MGC 74 can engage in ISUP signaling with MSC 22, as described above. With additional response signaling, a call path could thus be set up from the IP PBX server 40 to the cellular WCD, via the media gateway system 70 and the RAN 12 serving the cellular WCD, as shown in FIG. 9.

ii. Ringing Another IP PBX Extension

To ring another IP PBX extension, the IP PBX server 40 can apply its normal processes. The enterprise IP PBX server might do this after failing to connect the call to WCD 14. Alternatively, the enterprise IP PBX server might do this at the same time as it seeks to connect the call to WCD 14, perhaps to simultaneously ring the cellular WCD and the desk telephone of the cellular WCD's user. In that case, the enterprise IP PBX server could connect the call through to whichever one answers the call first.

iii. Sending the Call to Voice Mail

Similarly, if the IP PBX server decides to connect the call through to voice mail, the enterprise IP PBX can do so through its normal processes, such as engaging in SIP signaling to connect the call to the enterprise voice mail server.

4. Centralized Master IP PBX Server

With the widespread popularity of VoIP communication, many enterprises already have IP PBX servers in place to serve their users on their network. Advantageously, the present invention can be applied to extend those existing IP PBX servers (or later acquired enterprise IP PBX servers) to serve users of cellular wireless devices as well.

One way to do so, as described above, is to provide a communication path between the enterprise IP PBX server and the cellular carrier's media gateway system, so that the media gateway system can connect calls between the cellular RAN and the IP PBX server, and the IP PBX server can thereby manage the calls in much the same way that the IP PBX server manages calls for the telephone stations on the enterprise LAN.

As presently contemplated, another way to do so is to provide a centralized host IP PBX server in the carrier's network and to operate the host IP PBX server as a "master" IP PBX server to handle calls for WCD extensions on the enterprise IP PBX system.

In a preferred embodiment, the master IP PBX server could be the same make and model as the enterprise IP PBX server and would be configured largely (or fully) the same as the enterprise IP PBX server, so that the master IP PBX server can offer the same services as the enterprise IP PBX server. (A given master IP PBX server could be provisioned to serve multiple different enterprises, such as with partitioned logic and configurations for each enterprise for instance.)

More particularly, the master IP PBX server can be provisioned with configuration data for each WCD that is set as an extension on the enterprise IP PBX server (the slave IP PBX server), and the configuration data that the enterprise IP PBX server maintains for the WCD can direct the enterprise IP PBX server to turn to the master IP PBX server for call handling when faced with a request to handle a call to or from a WCD. Yet the enterprise IP PBX server itself can be set to fully manage calls involving non-WCD extensions, without the need to interact wit the master IP PBX server.

In operation, the master IP PBX server can then engage in IP-based call setup signaling with the MGC 74 to establish RTP communication between MGW 72 and the master IP PBX server. Further, the master IP PBX server can engage in both IP-based call setup signaling and RTP bearer communication with the enterprise IP PBX server, and the enterprise IP PBX server can in turn pass signaling and bearer data between the master IP PBX server and the enterprise telephone stations. (In an alternative embodiment, the enterprise IP PBX server can function as more than a mere conduit. For instance, it can apply some of its own logic to manage WCD calls as well.) Thus, the master IP PBX server would function as IP PBX server 40 in the description above, though its communications with enterprise telephone stations may pass through the applicable enterprise IP PBX server.

An advantage of this arrangement is that it allows the wireless carrier to better manage operation of the IP PBX system, such as to ensure that the IP PBX system and other entities (e.g., HLR, SCP, and media gateway system) are appropriately configured to facilitate serving WCD extensions on enterprise IP PBX system. Further, it can provide a centralized point (the master IP PBX server) with which various enterprise IP PBX servers can be set to communicate, rather than having IP PBX server be set to communicate with more likely many MGCs (distributed in various locations throughout a cellular carrier's network).

Figure 10:
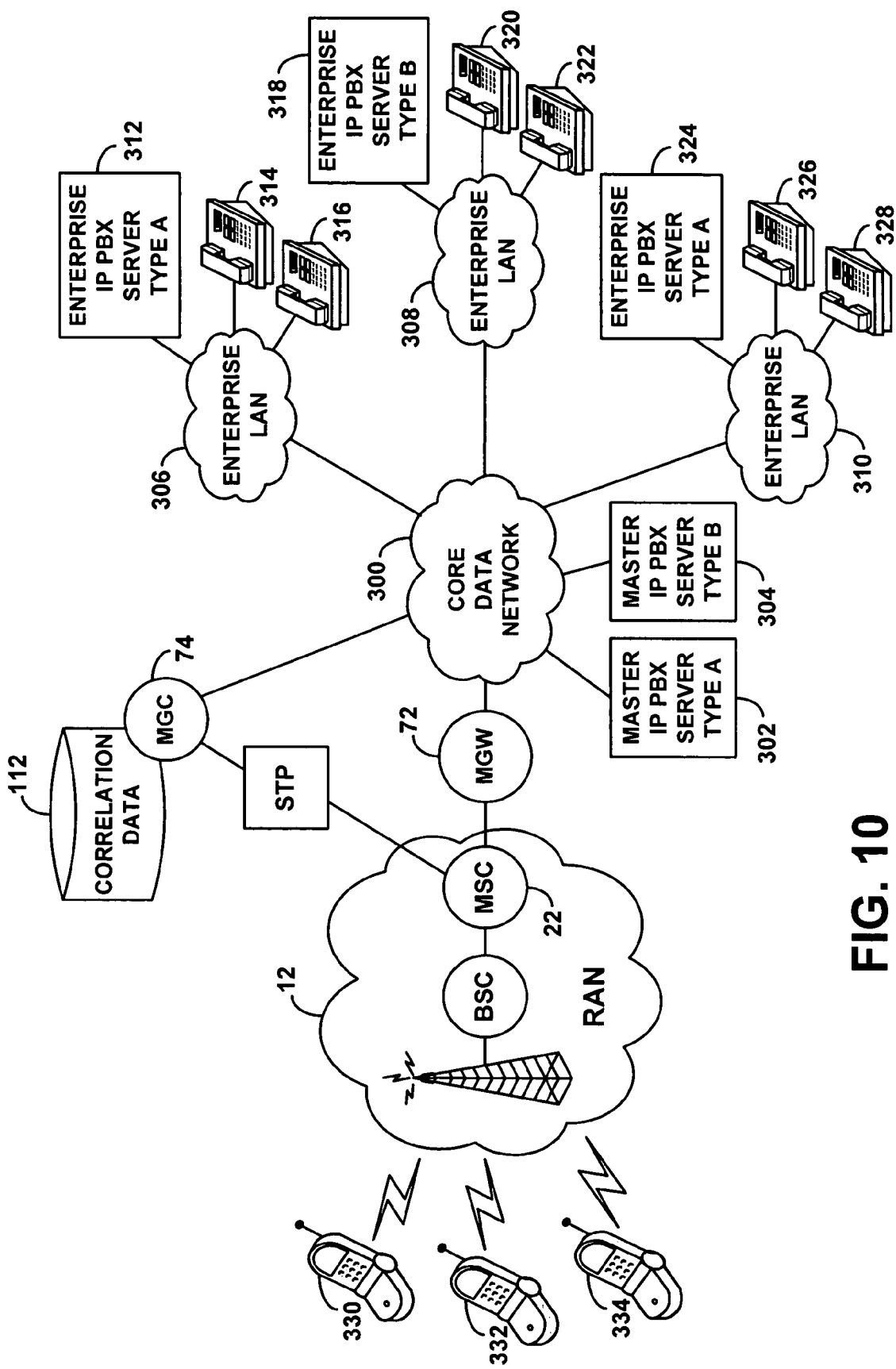
FIG. 10 is a block diagram of an example network arrangement including master IP PBX servers and enterprise IP PBX servers, in accordance with the exemplary embodiment.

FIG. 10 depicts an example of this master IP PBX server arrangement. As shown in FIG. 10, MGC 74 is communicatively linked with a carrier's core packet data network 300. Further sitting as nodes on network 300 are two representative master IP PBX servers 302, 304. Master IP PBX server 302 is an IP PBX server of "Type A," and master IP PBX server 304 is an IP PBX server of "Type B." Types A and B could be particular makes and models or particular configurations, for instance. By way of example, Type A could be an Avaya S8700 IP PBX server for instance, whereas Type B could be some other make and model IP PBX server.

Network 300 is then coupled with a plurality of enterprise networks 306, 308, 310. Further, sitting as a node on each enterprise network is a respective enterprise IP PBX server as well as a number of representative enterprise IP PBX telephone stations. In particular, sitting as nodes on enterprise network 306 are an enterprise IP PBX server 312 and representative enterprise telephone stations 314, 316; sitting as nodes on enterprise network 308 are an enterprise IP PBX server 318 and representative enterprise telephone stations 320, 322; and sitting as nodes on enterprise network 310 are an enterprise IP PBX server 324 and representative enterprise telephone stations 326, 328. As further shown by way of example, IP PBX servers 312 and 324 (on enterprise networks 306, 310) are of Type A, and IP PBX server 318 (on enterprise network 308) is of Type B.

FIG. 10 also depicts three representative WCDs 330, 332, 334, each of which may be set as extensions on one of the various enterprise IP PBX systems illustrated. For each WCD, the corresponding master IP PBX server (of the same type as the enterprise IP PBX server that serves the WCD) may thus have configuration data for the WCD, largely the same as the enterprise IP PBX server would be configured for the WCD if the master IP PBX server did not exist. For instance, WCD 330 may be set as an extension on enterprise IP PBX server 312, and master IP PBX server 302 (of the same type as enterprise IP PBX server 312) may include configuration data for WCD 330; WCD 332 may be set as an extension on enterprise IP PBX server 318, and master IP PBX server 304 (of the same type as enterprise IP PBX server 318) may include configuration data for WCD 332; and WCD 334 may be set as an extension on enterprise IP PBX server 324, and master IP PBX server 302 (of the same type as enterprise IP PBX server 324) may include configuration data for WCD 334.

With this arrangement, for example, when MGC 74 receives a request from MSC 22 to set up a call to or from WCD 330, MGC 74 may refer to its correlation data 112 and thereby determine that master IP PBX server 302 serves the WCD. (In one embodiment, for instance, the correlation data may associate WCD 330 with enterprise IP PBX server 312 and may then associate IP PBX server 312 with master IP PBX server 302.) MGC 74 may thus engage in call setup signaling to set up the call with master IP PBX server 302. Master IP PBX server 302 may then apply the enterprise PBX dialing plan (corresponding to enterprise IP PBX server 312) and the configuration data of WCD 330 to determine how to handle the call. In the event master IP PBX server 302 determines that the call should be connected in turn to an extension on the enterprise network 306, master IP PBX server 302 may then set up the call through enterprise IP PBX server 312 to that extension.

As another example, when MGC 74 receives a request from MSC 22 to set up a call to or from WCD 332, MGC 74 may refer to correlation data 112 and thereby determine that master IP PBX server 304 serves the WCD. MGC 74 may thus engage in call setup signaling to set up the call with master IP PBX server 304. Master IP PBX server 304 may then apply the enterprise PBX dialing plan (corresponding to enterprise IP PBX server 318) and the configuration data of WCD 332 to determine how to handle the call. In the event master IP PBX server 304 determines that the call should be connected in turn to an extension on the enterprise network 308, master IP PBX server 304 may then set up the call through enterprise IP PBX server 318 to that extension.

5. CONCLUSION

An exemplary embodiment of the present invention has been described above. Those skilled in the art will understand, however, that changes and modifications may be made to this embodiment without departing from the true scope and spirit of the present invention, which is defined by the claims.

We claim:

1. A method comprising:

receiving into a cellular radio access network (RAN) a call request seeking to set up a call for a cellular wireless communication device (WCD) that is operating in a wireless coverage area of the RAN, wherein the cellular RAN includes a base station that radiates to define the wireless coverage area and a mobile switching center (MSC) that is communicatively linked with the base station;

responsively (a) engaging in first call setup signaling between the cellular RAN and a media gateway system to set up a first leg of the call between the cellular RAN and the media gateway system, (b) identifying an IP PBX system that serves the cellular WCD, and (c) engaging in second call setup signaling between the media gateway system and the IP PBX system to set up a second leg of the call between the media gateway system and the IP PBX system; and setting up the call from the IP PBX system for the cellular WCD wherein the media gateway system includes a media gateway (MGW) and a media gateway controller (MGC), where engaging in the first call setup signaling between the cellular RAN and the media gateway system to set up the first leg of the call comprises engaging in the first call setup signaling between the MSC and the MGC to set up the first leg of the call between the MSC and the MGW, and wherein engaging in the second call setup signaling between the media gateway system and the IP PBX system to set up the second leg of the call comprises engaging in the second call setup signaling between the MGC and the IP PBX system to set up the second leg of the call.

2. The method of claim 1, wherein identifying the IP PBX system that serves the cellular WCD occurs at the media gateway system.

3. The method of claim 2, wherein identifying the IP PBX system that serves the cellular WCD comprises referring to data that correlates an identifier of the WCD with an identifier of the IP PBX system so as to identify the IP PBX system based on the identifier of the cellular WCD.

4. The method of claim 1, further comprising:
sending a query message from the MSC to a service control point (SCP) to obtain call processing guidance; and
receiving at the MSC from the SCP a response message directing the MSC to set up the call to the media gateway system.

5. The method of claim 4, further comprising:
operating the SCP to determine that the cellular WCD subscribes to IP PBX service, and responsively sending the response message to the MSC directing the MSC to set up the call to the media gateway system.

6. The method of claim 1, wherein the IP PBX system includes an IP PBX server and a media server, and wherein engaging in the second call setup signaling between the media gateway system and the IP PBX system to set up the second leg of the call comprises engaging in the second call setup signaling to set up the second leg between the MGW and the media server.

7. The method of claim 1, further comprising:
co-locating the MGW and the MSC at a common site.

8. The method of claim 1, wherein the first call setup signaling is SS7 signaling and the first call leg is a circuit-switched connection, and wherein the second call setup signaling is IP-based signaling and the second call leg is a packet-switched connection.

9. The method of claim 8, wherein the IP-based signaling comprises signaling selected from the group consisting of Session Initiation Protocol (SIP) signaling and H.323 signaling, and wherein the packet-switched connection comprises a Real-time Transmission Protocol (RTP) session.

10. The method of claim 1, wherein the call is an outside call from the cellular WCD to a directory number on the public switched telephone network (PSTN), and wherein setting up the call from the IP PBX system comprises setting up the call from the IP PBX system via the PSTN to the directory number on the PSTN.

11. The method of claim 1, wherein the call is an inside call from the cellular WCD to an extension on the IP PBX system, and wherein setting up the call from the IP PBX system comprises setting up the call from the IP PBX system via an enterprise network to the extension.

12. The method of claim 1, wherein the call is an outside call from a directory number on the public switched telephone network (PSTN) to a directory number of the cellular WCD, and wherein setting up the call from the IP PBX system comprises setting up the call from the IP PBX system via the media gateway system back to the cellular RAN and in turn to the cellular WCD.

13. The method of claim 12, further comprising maintaining at the IP PBX system a set of data that correlates an extension on the IP PBX system with the directory number of the cellular WCD,
wherein setting up the call from the IP PBX system further comprises setting up the call from the IP PBX system to the extension.

14. The method of claim 13, further comprising:
simultaneously setting up the call (i) from the IP PBX system to the cellular WCD and (ii) from the IP PBX system to the extension.

15. The method of claim 13, further comprising:
sequentially setting up the call (i) from the IP PBX system to the cellular WCD and (ii) from the IP PBX system to the extension.

16. The method of claim 1, wherein the cellular RAN is operated by a cellular carrier, the method further comprising:
maintaining the IP PBX system on a core data network operated by the cellular carrier, wherein the IP PBX system serves enterprise telephone stations on an enterprise network that is communicatively linked with the core data network.

17. The method of claim 16, wherein the IP PBX system is a master IP PBX system hosted on the core data network.

18. The method of claim 1, wherein the cellular RAN and media gateway system are operated by a cellular carrier, wherein the media gateway system sits on a core data network operated by the carrier, wherein the IP PBX system serves enterprise telephone stations on an enterprise network, and wherein the IP PBX system sits on the enterprise network and is communicatively linked with the core data network.

19. A method comprising:
receiving into a cellular radio access network (RAN) a call request seeking to set up a call for a cellular wireless communication device (WCD) that is operating in a wireless coverage area of the RAN wherein the call is an outside call from a directory number on the public switched telephone network (PSTN) to a directory number of the cellular WCD;
responsively (a) engaging in first call setup signaling between the cellular RAN and a media gateway system to set up a first leg of the call between the cellular RAN and the media gateway system, (b) identifying an IP PBX system that serves the cellular WCD, and (c) engaging in second call setup signaling between the media gateway system and the IP PBX system to set up a second leg of the call between the media gateway system and the IP PBX system; and
setting up the call from the IP PBX system for the cellular WCD, wherein setting up the call from the IP PBX system comprises setting up the call from the IP PBX system via the media gateway system back to the cellular RAN and in turn to the cellular WCD,
wherein setting up the call from the IP PBX system via the media gateway system to the cellular RAN comprises:
(i) engaging in third call setup signaling between the IP PBX system and the media gateway system to set up a third leg of the call between the IP PBX system and the media gateway system, and (ii) engaging in fourth call setup signaling between the media gateway system and the cellular RAN to set up a fourth leg of the call between the media gateway system and the cellular RAN.

20. The method of claim 19, further comprising:
sending a query from the media gateway system to a home location register (HLR) that serves the cellular WCD, seeking to obtain a temporary local directory number (TLDN) for use in routing the call to the cellular WCD;
receiving a response from the HLR providing the TLDN; and
then engaging in the fourth signaling for setting up the call to the TLDN.

21. The method of claim 20, further comprising:
including in the query to the HLR an indication that the media gateway system is not Wireless Intelligent Network (WIN) capable, so as to cause the HLR to return the TLDN instead of returning an Advanced Termination Trigger.

22. The method of claim 20, further comprising:
including in the query to the HLR a LOCATION trigger-type, rather than a MOBILE-TERMINATION trigger-type, so as to cause the HLR to return the TLDN instead of returning an Advanced Termination Trigger.

23. The method of claim 19, wherein engaging in the fourth call setup signaling between the media gateway system and the cellular RAN includes providing the cellular RAN with an indication that the call has already been routed to the IP PBX system, in order to avoid having the cellular RAN endlessly loop the call back to the IP PBX system.

24. The method of claim 23 wherein the cellular RAN includes a base station that radiates to define the wireless coverage area and a mobile switching center (MSC) communicatively linked with the base station, the method further comprising:

responsive to the fourth call setup signaling, sending from the MSC to a service control point (SCP) a query message that provides the indication;

determining at the SCP, based on the indication, that the MSC should continue to set up the call;

sending from the SCP to the MSC a response message directing the MSC to continue setting up the call; and responsively setting up the call from the MSC to the cellular WCD.

25. A system comprising:

a cellular radio access network (RAN) comprising (i) a base station that radiates to produce a wireless coverage area and (ii) a mobile switching center that provides connectivity between the base station and the public switched telephone network, wherein the cellular RAN is operated by a cellular carrier;

a media gateway system comprising (i) a media gateway arranged to engage in bearer communication with the mobile switching and (ii) a media gateway controller arranged to engage in signaling communication with the mobile switching center and with the media gateway;

an IP PBX system arranged to serve a plurality of enterprise telephone stations that are situated on an enterprise packet-switched network, the IP PBX system being further arranged to engage in signaling communication with the media gateway controller and bearer communication with the media gateway, wherein the IP PBX system comprises (i) a hosted master IP PBX server sitting as a node on a core data network operated by the cellular carrier and (ii) a slave IP PBX server sitting as a node on the enterprise packet-switched network, and wherein the core data network is communicatively linked with the enterprise packet-switched network;

wherein, when the cellular RAN receives a request seeking to set up a call for a cellular wireless communication device (WCD) that is operating in the wireless coverage area, the cellular RAN engages in first call setup signaling with the media gateway controller to set up a first leg of the call between the cellular RAN and the media gateway;

wherein, the media gateway controller determines that the IP PBX system serves the cellular WCD, and the media gateway controller responsively engages in second call setup signaling with the IP PBX system to set up a second leg of the call between the media gateway and the IP PBX system; and wherein the IP PBX system sets up the call for the cellular WCD.

26. The system of claim 25, wherein the media gateway and mobile switching center are co-located at a common site.

27. The system of claim 25, wherein the call is an outside call from the cellular WCD to a directory number on the public switched telephone network (PSTN), and wherein the IP PBX system sets up the call to the directory number on the PSTN.

28. The system of claim 25, wherein the call is an inside call from the cellular WCD to an extension on the IP PBX system, and wherein the IP PBX system sets up the call to the extension via the enterprise packet-switched network.

29. The system of claim 25, wherein the call is an outside call from a directory number on the public switched telephone network (PSTN) to a directory number of the cellular WCD, wherein the IP PBX system sets up the call to back to the media gateway system, the media gateway system sets up the call back to the cellular RAN, and the cellular RAN sets up the call via an air interface to the cellular WCD.

* * * * *